United States Patent [19]
Frank et al.

[11] Patent Number: 5,119,481
[45] Date of Patent: Jun. 2, 1992

[54] REGISTER BUS MULTIPROCESSOR SYSTEM WITH SHIFT

[75] Inventors: Steven J. Frank, Hopkinton; Henry Burkhardt, III, Manchester; Frederick D. Weber, Concord, all of Mass.

[73] Assignee: Kendall Square Research Corporation, Waltham, Mass.

[21] Appl. No.: 696,291

[22] Filed: Apr. 26, 1991

Related U.S. Application Data

[63] Continuation of Ser. No. 509,480, Apr. 13, 1990, abandoned, which is a continuation of Ser. No. 136,701, Dec. 22, 1987, abandoned.

[51] Int. Cl.⁵ ...................... G06F 13/00; G06F 15/16
[52] U.S. Cl. .............................. 395/325; 364/DIG. 1; 364/229.3; 364/259.5; 370/85.1; 370/85.15
[58] Field of Search ... 364/200 MS File, 900 MS File; 370/85.1, 85.15, 60, 61, 91, 94.1

[56] References Cited

U.S. PATENT DOCUMENTS

| | | |
|---|---|---|
| 3,748,647 | 7/1973 | Ashany et al. |
| 4,011,545 | 3/1977 | Nadiv |
| 4,031,512 | 6/1977 | Faber |
| 4,334,305 | 6/1982 | Girardi ............................ 364/200 |

FOREIGN PATENT DOCUMENTS 2178205  4/1987  United Kingdom.

Primary Examiner—Eddie P. Chan
Attorney, Agent, or Firm—Lahive & Cockfield

[57] ABSTRACT

A digital data processing apparatus includes a shift-register bus that transfers packets of digital information. The bus has a plurality of digital storage and transfer stages connected in series in a ring configuration. A plurality of processing cells, each including at least a memory element, are connected in a ring configuration through the bus, with each cell being in communication with an associated subset of stages of the bus. At least one processing cell includes a cell interconnect that performs at least one of modifying, extracting, replicating and transferring a packet based on an association, if any, between a datum identified in that packet and one or more data stored in said associated memory element. The cell interconnect responds to applied digital clock cycle signals for simultaneously transferring at least a selected packet through successive stages of the bus at a rate responsive to the digital clock cycle rate, while performing the modifying, extracting, replicating and transferring operation.

17 Claims, 11 Drawing Sheets

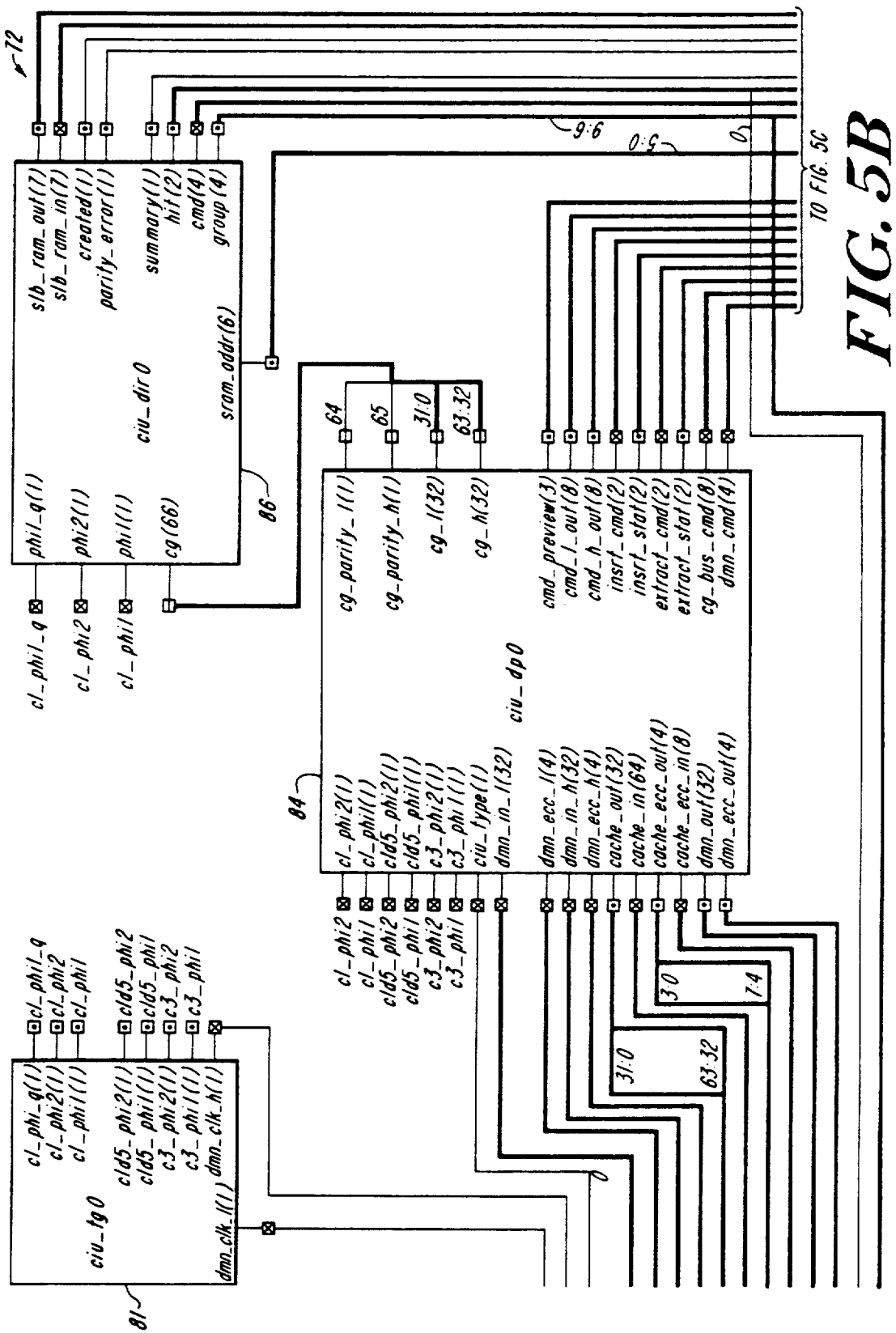

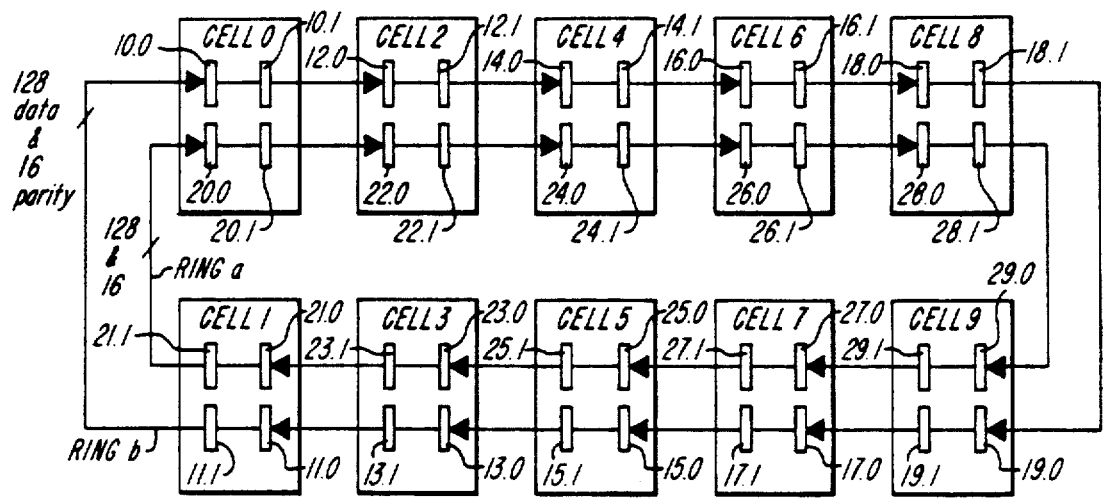
FIG. 6
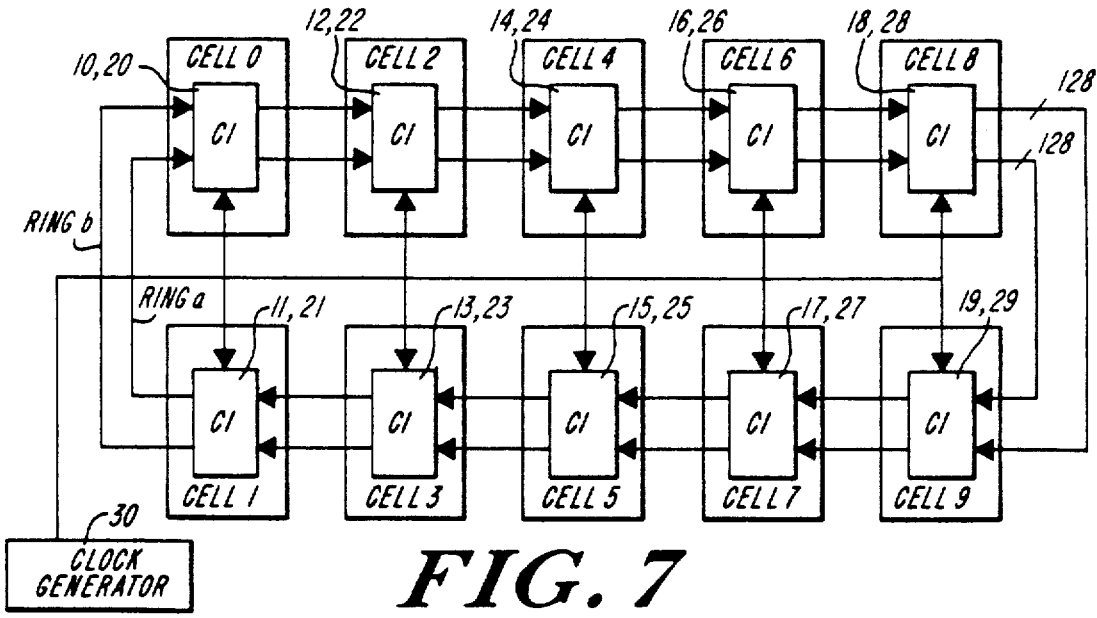
FIG. 7
| ADDR | ADDR |
|---|---|
| CMD | CMD |
| DATA 0 | DATA 1 |
| DATA 2 | DATA 3 |
| DATA 4 | DATA 5 |
| DATA 6 | DATA 7 |
FIG. 8

REGISTER BUS MULTIPROCESSOR SYSTEM WITH SHIFT

This is a continuation of copending Application Ser. No. 509,480 filed 13 Apr., 1990, which is abandoned, and which is a continuation of Patent Application Ser. No. 136,701 filed 22 Dec., 1987, which is abandoned.

BACKGROUND OF THE INVENTION

This invention relates generally to digital data processing systems, and, in particular, to a bus structure suitable for use with multiprocessor computer systems.

Multiprocessor computer systems provide multiple independent central processing units (CPUs) which can be coherently interconnected. Recent efforts in the multiprocessor field have concentrated on multiprocessor systems wherein each of a plurality of processors is equipped with a dedicated random access or cache memory unit. These multiple processors typically communicate with one another via a common system bus structure (i.e. shared bus systems), or by signalling within a shared memory address area (i.e. shared address space systems).

In recent years, a wide range of structures and methods have been proposed or developed to interconnect the processors of a shared bus system multiprocessor.

One such shared bus multiprocessing computer system is disclosed in United Kingdom Patent application No. 2,178,205 (published Feb. 4, 1987). That system is understood to comprise a plurality of processors, each having its own dedicated cache memory, and wherein the cache memories are connected to one another over a shared bus.

Conventional shared bus systems, however, lack adequate bandwidth to provide multiple processors with short effective access times during periods of high bus contention. Although a number of caching schemes have been proposed and developed for the purpose of reducing bus contention, bus saturation still limits the speed and size of multiprocessor computers.

Additionally, the speed of a conventional bus structure is limited by the speed of light and by bus length. In particular, as more processors are linked to a conventional bus, bus length increases and thus the time required for signal transfer increases.

Another class of interconnection systems, known as crossbar networks, avoid some of the limitations of conventional bus systems. In a crossbar network, however, the path taken by a given signal cannot be uniquely specified. Moreover, cost increases as the square of the number of interconnected processors. These characteristics make crossbar networks unsuitable for multiprocessor systems.

There accordingly exists a need for an interconnection system for multiprocessor computer systems which can accommodate the large volume of interconnect access requests generated by multiple processors. In particular, there exists a need for an interconnection system in which transfer speed is independent of the number of interconnected processors.

It is thus an object of the invention to provide an improved multiprocessor digital data processing system.

It is another object of the invention to provide an interconnection system for a multiprocessor digital computer structure which can provide multiple processors with short effective access times under all operating conditions.

It is yet another object of the invention to provide an interconnection system having the above characteristics which is applicable to both shared memory and non-shared memory multiprocessors.

It is a further object of the invention to provide an interconnection system having high bandwidth and the capability of transferring signals at rates sufficient to allow multiprocessors to operate at full speed.

It is another object of the invention to provide an interconnection system for a multiprocessor wherein bandwidth increases in proportion to the number of processors.

It is a further object of the invention to provide an interconnection system wherein transfer speed is independent of the number of interconnected processors, and is limited only by the switching speed of an individual interconnect.

Other general and specific objects of the invention will in part be obvious and will in part appear hereinafter.

SUMMARY OF THE INVENTION

The aforementioned objects are attained by the invention, which provides a digital data processing apparatus having a bus structure for transferring information-representative digital signals, the bus structure including a shift register element having a set of digital storage and transfer stages connected in series, for sequentially storing and transferring said information-representative digital signals. The invention also includes a plurality of processing cells, connected in a ring configuration to the bus structure, wherein at least one of the cells includes a central processing unit, an associated memory element for storing information-representative digital signals, coupled with the central processing unit for information transfer therebetween, and associated cell interconnect units, connected in circuit with the shift register element, and with an associated central processing unit, for transferring information-representative signals onto the shift register element.

In accordance with one aspect of the invention, the bus structure comprises unidirectional information-representative signal flow paths, and the cell interconnect units include elements for driving information-representative signals along the flow path defined by the bus structure.

In another aspect of the invention, each stage of the shift register element includes latch and register elements for storing a digital information-representative signal word of (n) digital bits, where (n) is a positive integer, and the cell interconnect units include timing control elements responsive to applied digital clock cycle signals for sequentially driving information-representative digital words through successive stages of the shift register element at a rate controlled by the digital clock cycle rate. In accordance with this aspect of the invention, the shift register element includes elements for storing in a given stage of the shift register element a given digital word for one applied digital clock cycle, and transferring a given digital word to a succeeding stage of the shift register element after an applied digital clock cycle. Moreover, in this aspect of the invention, each cell interconnect unit has associated therewith a subset of (s) stages of the shift register structure, where (s) is a positive integer, so that a given digital word is resident in a stage associated with each cell interconnect unit for (s) applied digital clock cycles.

In another aspect of the invention, the shift register structure includes elements for sequentially transferring digital signal packets comprising (w) corresponding digital words, where (w) is a positive integer, so that a digital word corresponding to a given digital signal packet is resident in at least one stage associated with a given cell interconnect unit for (s) +(W-1) digital clock cycles.

The invention further provides data processing apparatus wherein the shift register structure includes elements for simultaneously transferring to successive shift register stages (p) digital signal Packets, where (p) is a positive integer given by $$(p)=(c)(s)/(w)$$

where (c) is the number of cell interconnect units, (s) is the number of shift register stages associated with each cell interconnect unit and (w) is the number of digital words in each digital signal packet. In accordance with the invention, as the number of cell interconnect units in a ring is increased, the flux of transfer operations through the ring is constant, and the number of bus operations which can be executed during a complete bus cycle increases linearly.

Another aspect of the invention provides data processing apparatus wherein at least one of the processing cells described above includes elements for generating and transmitting to an associated cell interconnect unit a cell interconnect control signal representative of a request to store an information-representative signal in a first associated stage of the shift register structure.

In accordance with this aspect of the invention, at least one of the processing cells includes elements for generating and transmitting to an associated cell interconnect unit a cell interconnect control signal representative of a request for access to an information-representative signal stored in a first associated stage of the shift register structure. The associated cell interconnect unit in turn includes elements, responsive to the cell interconnect control signal, for extracting the information-representative signal stored in the first associated stage of the shift register structure and for transferring the extracted information-representative signal to the associated cell.

In a digital data processing apparatus of the type described above, the associated cell interconnect unit can also include an element, responsive to the cell interconnect control signal, for replicating the information-representative signal stored in the first associated stage of the shift register structure and for transferring the replicated information-representative signal to the cell.

In yet another aspect of the invention, at least one of the processing cells includes an element for generating and transmitting to an associated cell interconnect unit, a cell interconnect control signal representative of a request to transfer, unchanged, an information-representative signal stored in a first associated stage of the shift register structure to a second, succeeding associated stage of the shift register structure.

In accordance with this aspect of the invention, the associated cell interconnect unit can include an element, responsive to the cell interconnect control signal, for enabling transfer to the second, succeeding associated stage of the shift register structure the information-representative signal stored in the first associated stage of the shift register structure.

The invention further contemplates data processing apparatus of the type described above, wherein at least one of the processing cells include an element for generating and transmitting to an associated cell interconnect means a cell interconnect control signal representative of a request to identify a given digital word stored in an associated stage of the shift register structure as the first word of a data packet. In accordance with this aspect of the invention, the associated cell interconnect unit can include means, responsive to the cell interconnect control signal, for setting a portion of the given digital word to a selected value identifying the given digital word as the first word of the data packet.

Yet another aspect of the invention provides a digital data processing apparatus having a bus structure and plurality of processing cells of the type described above, wherein at least one of the cells includes an associated cell interconnect unit, connected in circuit with the shift register structure, and with an associated central processing unit, for transferring information-representative signals onto the shift register structure, the cell interconnect unit comprising a subset of serially connected stages of the shift register structure.

The invention accordingly comprises apparatus embodying features of construction, combinations of elements and arrangements of parts as exemplified in the following detailed disclosure, and the scope of the invention is indicated in the claims.

BRIEF DESCRIPTION OF THE DRAWINGS

For a fuller understanding of the nature and objects of the invention, reference should be made to the following detailed description and the accompanying drawings, in which:

FIG. 6 depicts the shift register stages associated with the cell interconnects of FIG. 3;

FIG. 7 depicts clock signal distribution in the embodiment of FIG. 3; and

FIG. 8 depicts the contents of an exemplary data packet processed by the embodiment of FIG. 3.

DESCRIPTION OF THE ILLUSTRATED EMBODIMENT

Structure

Figure 1:
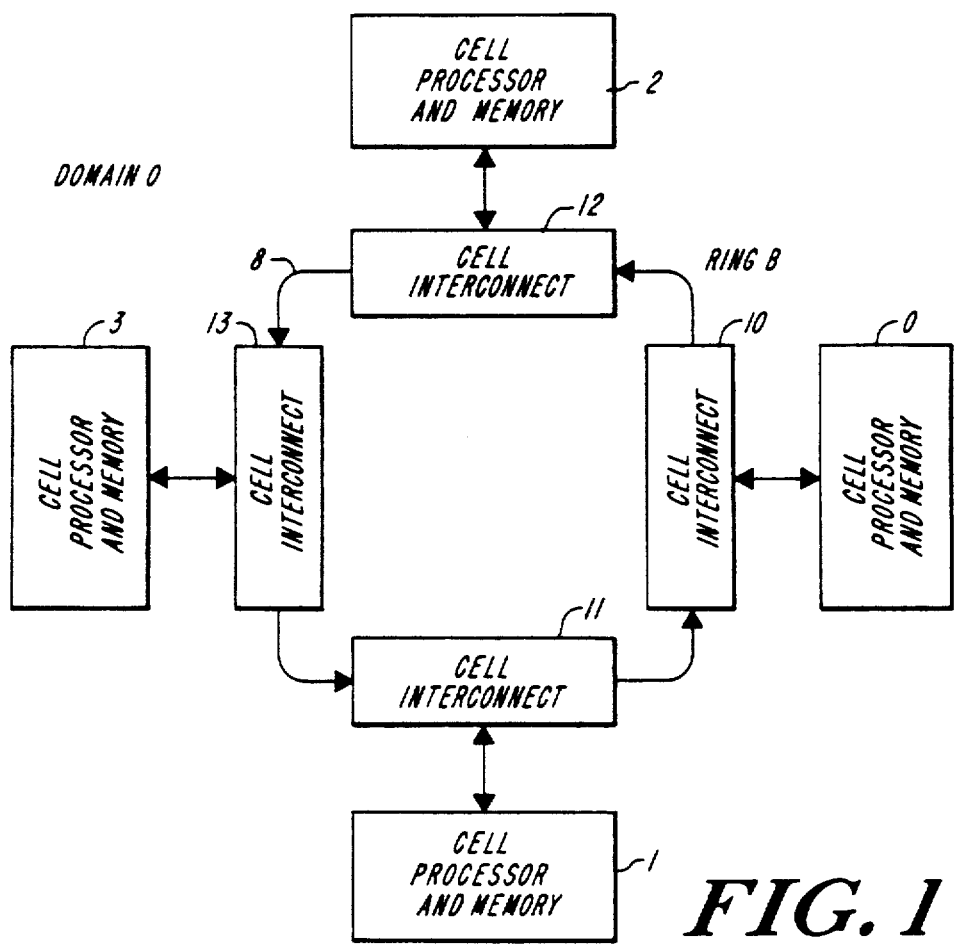
FIG. 1 depicts the structure of a multiprocessor computer system constructed in accordance with the invention.

FIG. 1 depicts a multiprocessor computer utilizing a bus system constructed in accordance with the invention. The multiprocessor system is hierarchically constructed from processors, cells and domains. Each of the processing cells 0, 1, 2 and 3 contains a processor and cache memory, as discussed below in connection with FIG. 2. The cells 0-3 are interconnected by cell interconnects (CIs) 10-13 and bus 8, thereby collectively forming Domain 0. Domains, in turn, are interconnected by domain interconnects (not shown), to form a complete system. The structure of cell interconnects is described hereinafter in connection with FIGS. 4 and 5, and the structure and operation of the illustrated multiprocessor system is more fully discussed in U.S. patent application Ser. No. 136,930 filed on even date herewith, and incorporated herein by reference.

Figure 2A:
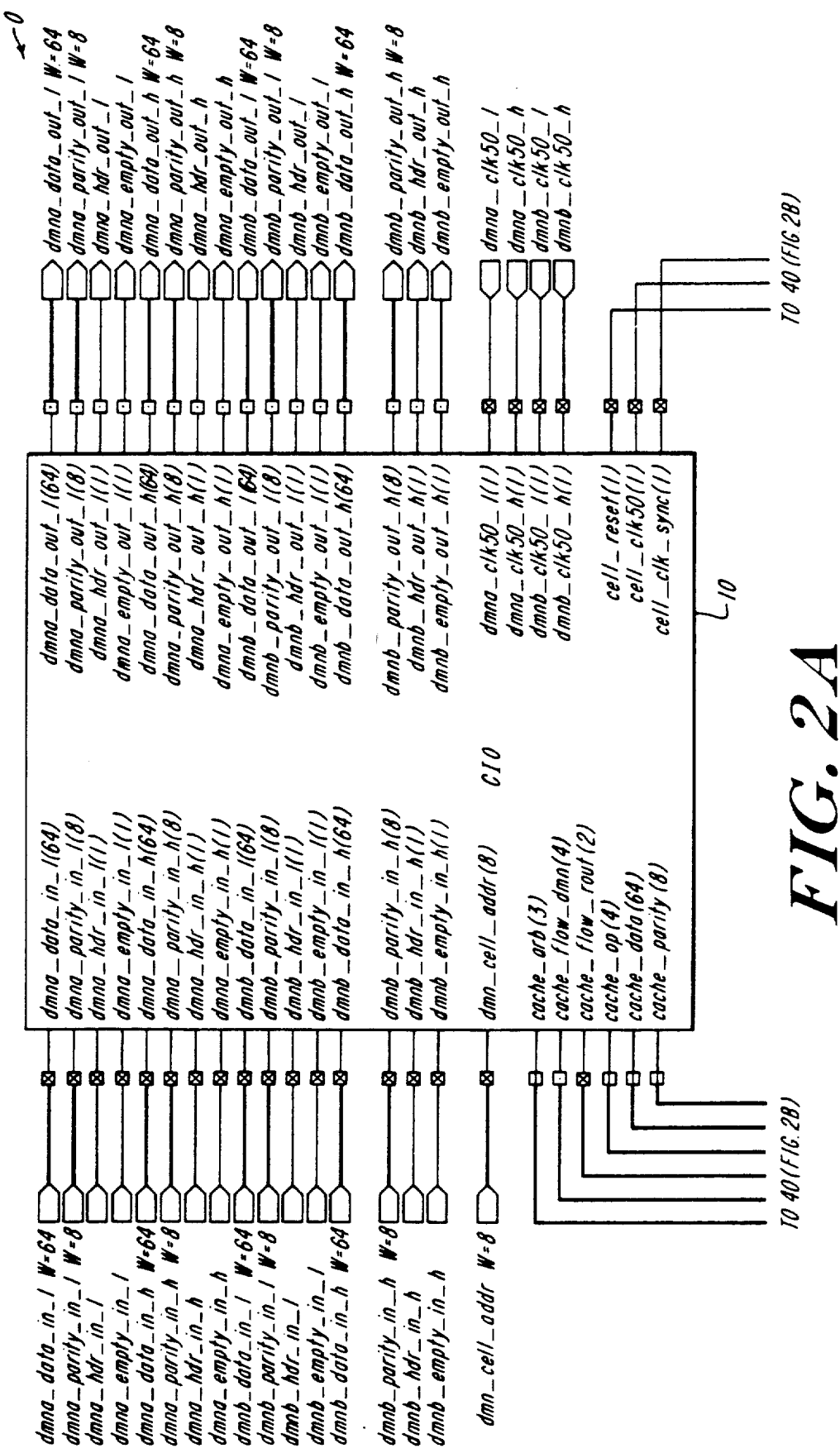
FIG. 2 comprising 2A and 2B depicts detail of the structure of a processing cell illustrated in FIG. 1.
Figure 2B:
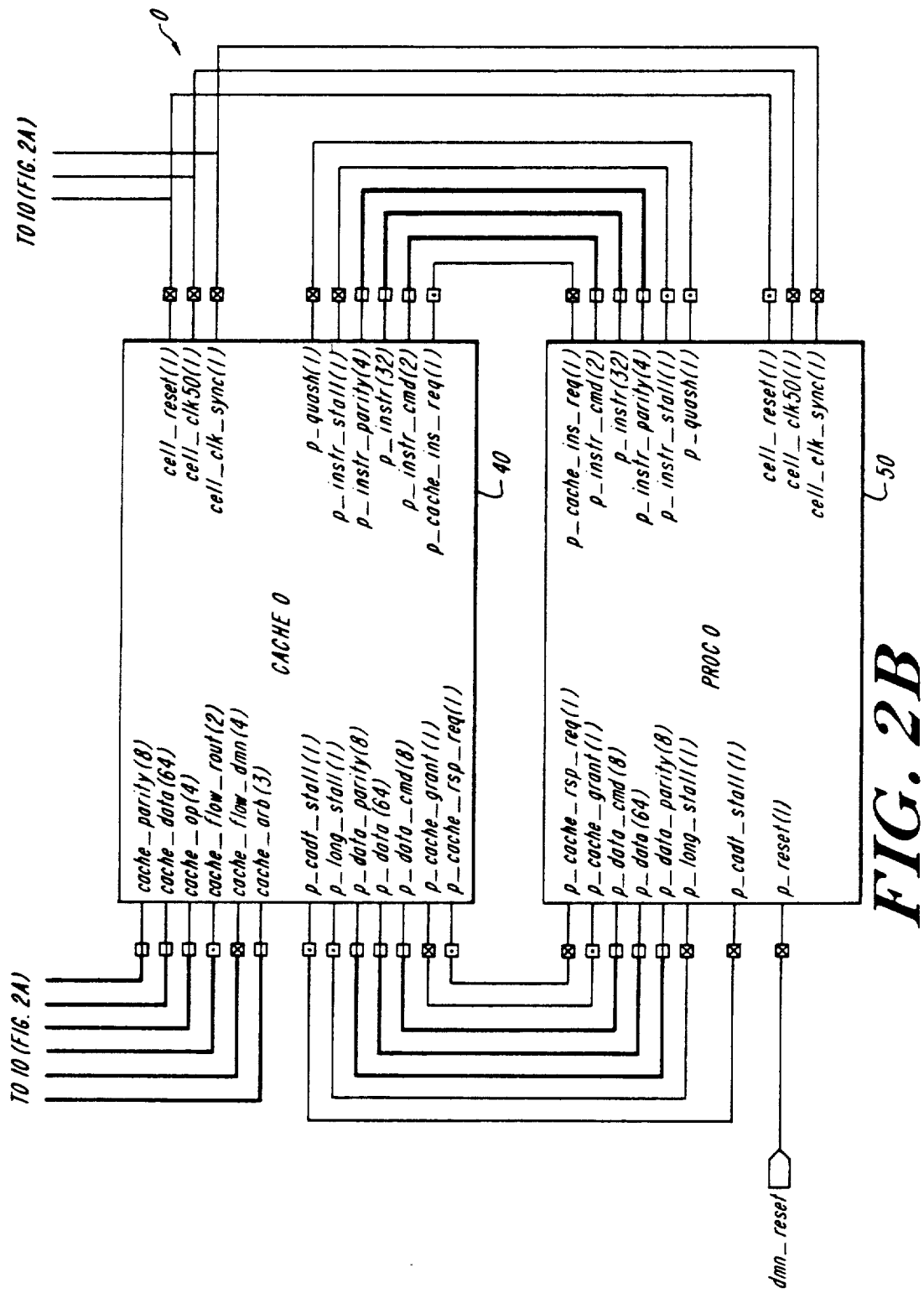
Figure 4A:
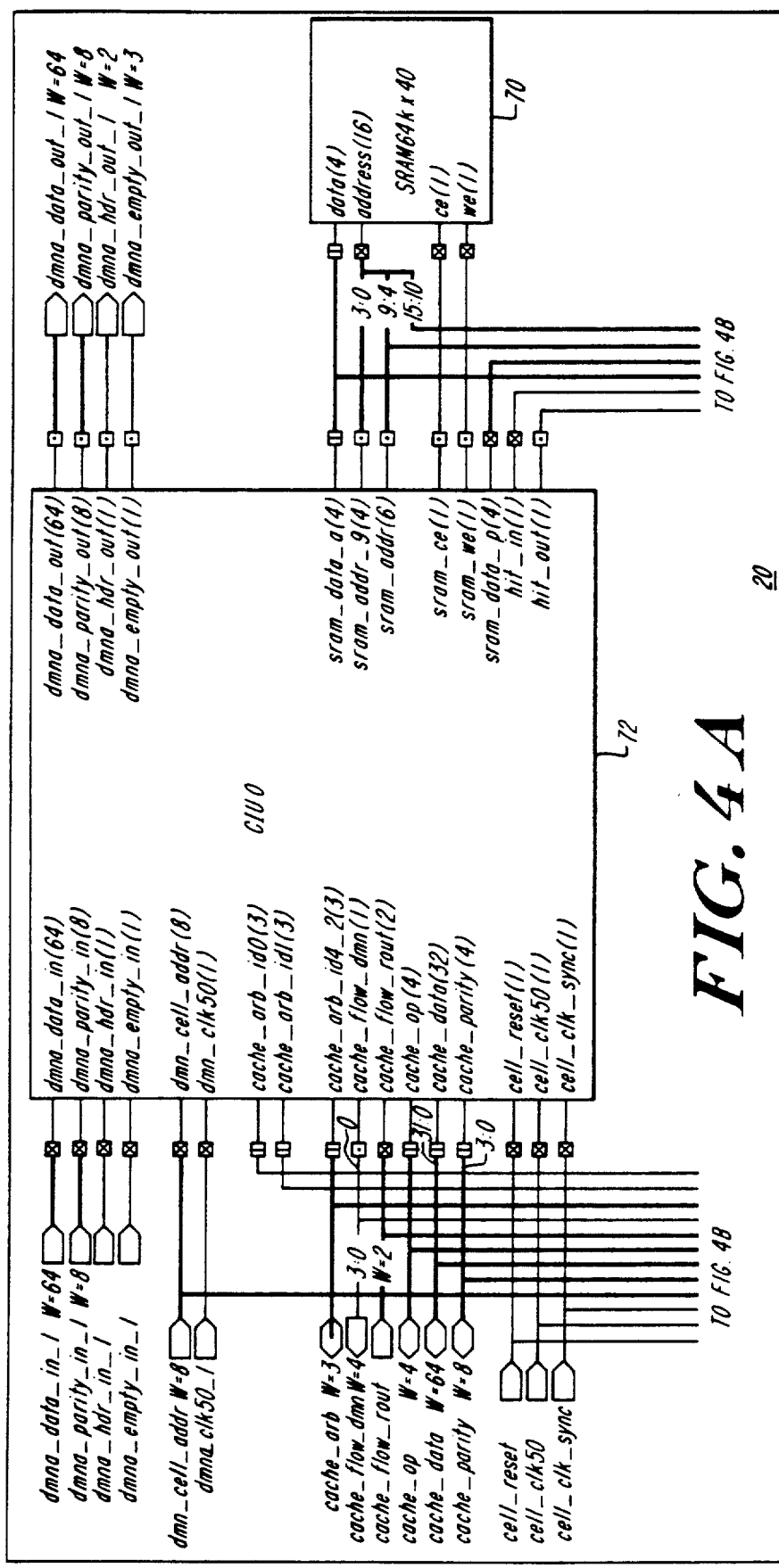
FIG. 4 comprising 4A, 4B, 4C and 4D depicts detail of the structure of a cell interconnect of FIG. 3.
Figure 4B:
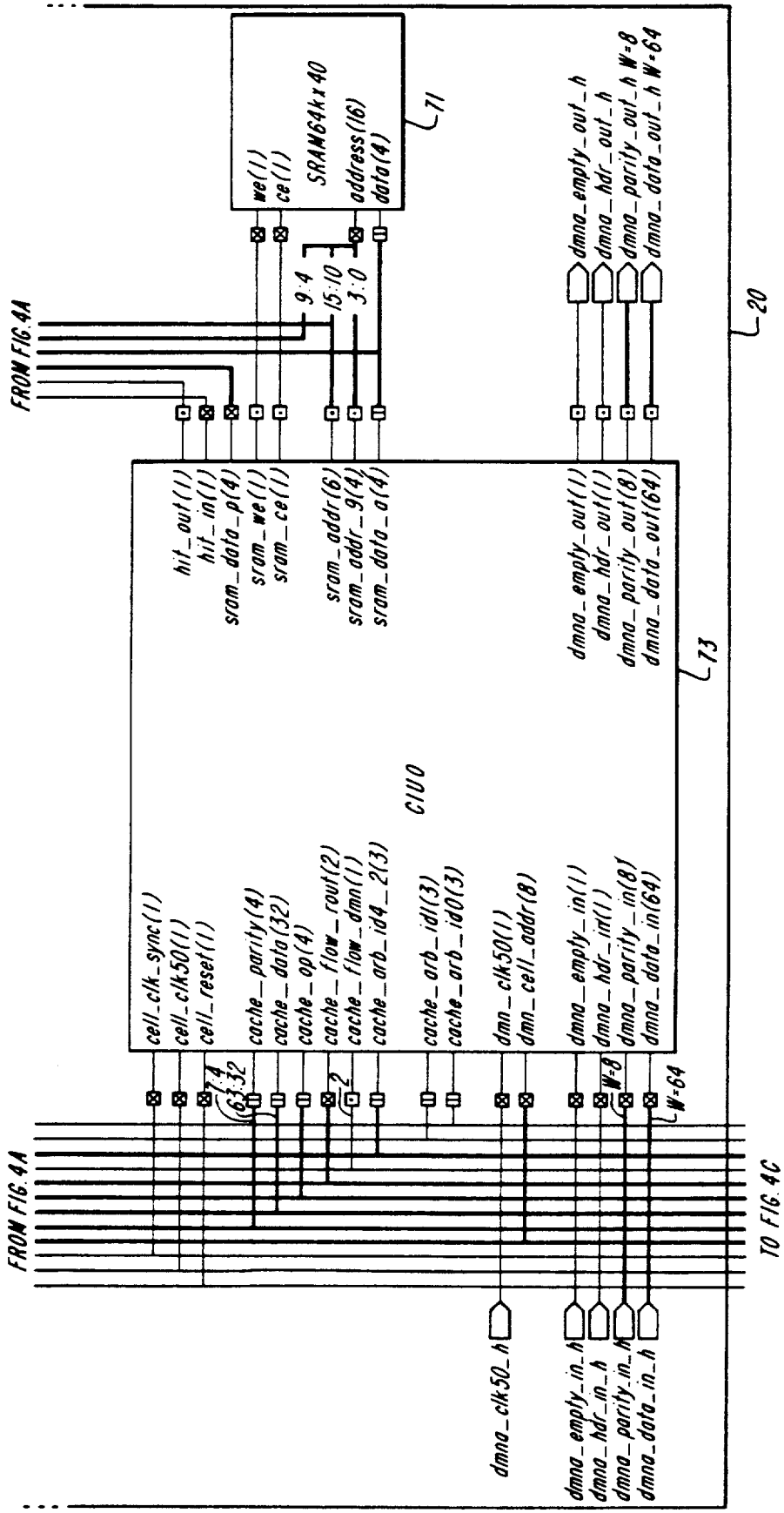
Figure 4C:
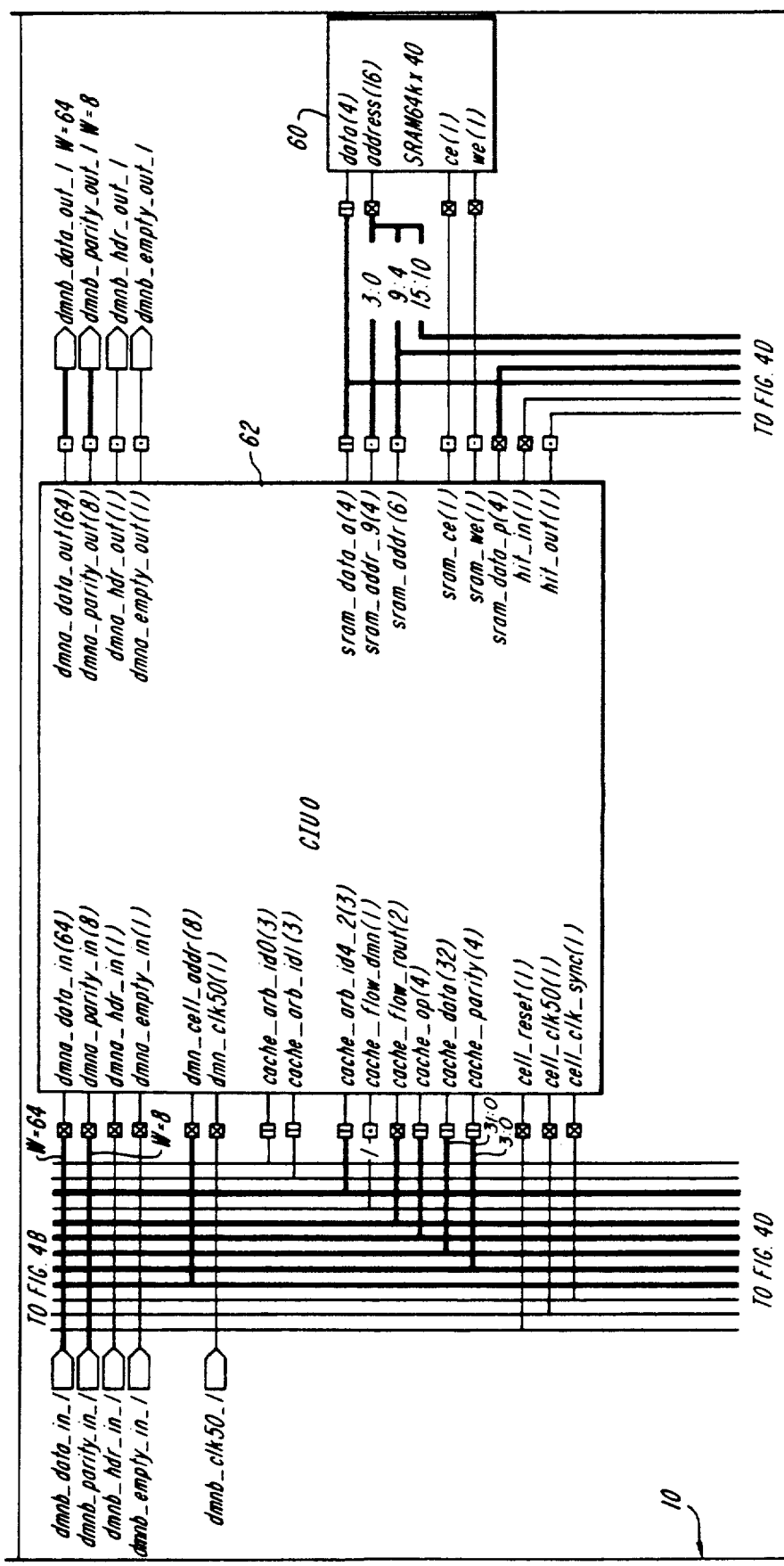
Figure 4D:
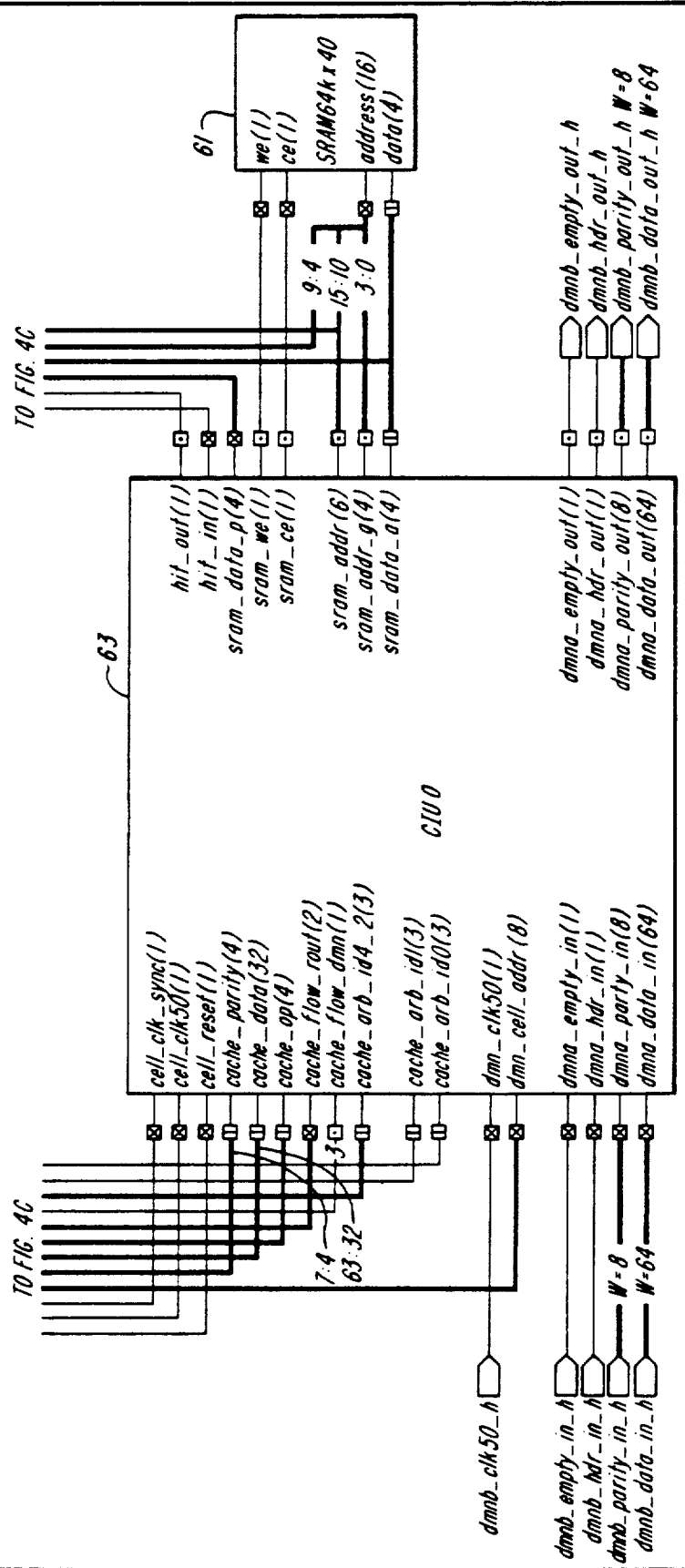

FIG. 2 depicts the components of processing cell 0, including processor (PROC) 50, cache 40 and cell interconnect (CI) 10. Data, parity, and control signals Passed between processor 50, cache 40 and cell interconnect 10 are indicated in FIG. 2. The datapath width associated with each respective signal is indicated by numerals in brackets. For example, cache data signals (cache_data [64]) passed between cell interconnect 10 and cache 40 have a 64 bit datapath width, as do processor data signals (p_data[64]) passed between cache 40 and processor 50.

As FIG. 2 illustrates, cell interconnect 10 receives and transmits DOMAIN DATA signals (dmn_data), DOMAIN PARITY signals dmn_parity), DOMAIN EMPTY signals (dmn_empty), DOMAIN HEADER signals (dmn_hdr), DOMAIN CELL ADDRESS signals (dmn_cell_addr), and DOMAIN CLOCK signals (dmn_clk50) discussed in greater detail hereinafter. In addition, cell interconnect 10 processes cache arbitration, routing, operation, and parity signals as indicated in FIG. 2. The structure of cell interconnect 10 is discussed in greater detail below in connection with FIG. 4. Moreover, further understanding of the logic components and structure of cache 40 and processor 50 may be had by reference to the schematics incorporated herein as Appendix A, and by reference to U.S. Ser. No. 136,930. Cell interconnect 10 provides interconnection of cell 0 into a multiple-cell domain like that depicted in FIG. 3.

Figure 3:
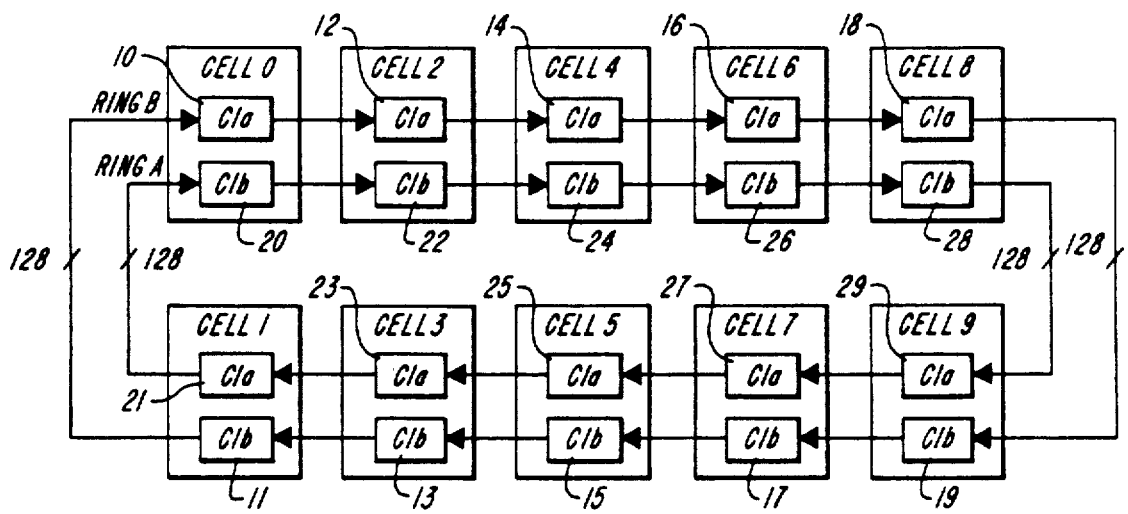
FIG. 3 depicts a plurality of the processing cells of FIG. 2 interconnected by a bus system constructed in accordance with the invention.

FIG. 3 illustrates the configuration of a ten cell domain, containing cells 0-9 interconnected in accordance with the invention in a dual ring bus structure organized as ring A and ring B. Utilizing plural rings is an important feature of the invention, which enables the system to continue operating in the event of single point component failures, and increases the bandwidth of the interconnection system. In a preferred practice of the invention, utilizing two rings, A and B, ring A is configured for transfers involving even page addresses in memory, and ring B for odd page addresses in memory. This interleaving mode is discussed in greater detail hereinafter. Those skilled in the art will understand that the invention may be practiced in an embodiment having more than two rings.

Rings A and B are preferably 50 megahertz synchronous shift registers having plural data storage stages with a 128 bit datapath width, as indicated in FIG. 3. Each of the cells 0-9 communicates with rings A and B through two associated Cell Interconnects (CIs). As FIG. 3 illustrates, cell interconnects 10-19 connect cells 0-9, respectively, to ring B, while cell interconnects 20-29 connect cells 0-9, respectively, to ring A.

A preferred cell interconnect structure is illustrated in FIG. 4. Two cell interconnect units (CIUs) 72 and 73 and two 64K×4 static RAMs (SRAMs) 70 and 71 are configured in pairs to form a single cell interconnect 20. Similarly, cell interconnect units 62 and 63, and SRAMs 60 and 61 are utilized to form cell interconnect 10. Each cell interconnect presents two 64 bit data connections from its cell to a respective ring (dmn_data) and one 64 bit connection to its cell cache bus (cache data). The structure and operation of such a cell cache bus are described in U.S. Ser. No. 136,930. Through these connections, the cell interconnect moves requests and responses between the cell and a respective ring.

The ring connections of each cell interconnect collectively form an input port and an output port. In operation, each cell interconnect moves the data on its input port through two stages (comprising four latches), modifies the data as required by a given cell interconnect unit operation and presents the data on its output port. Accordingly, when a number of cell interconnects are linked in a loop, the delay stages form a shift register such as Ring A or Ring B. Each cell interconnect receives data from the previous cell interconnect in its ring and forwards data to the next. An insertion and extraction protocol described in greater detail hereinafter allows the cell interconnects to pass data between cells.

Figure 5A:
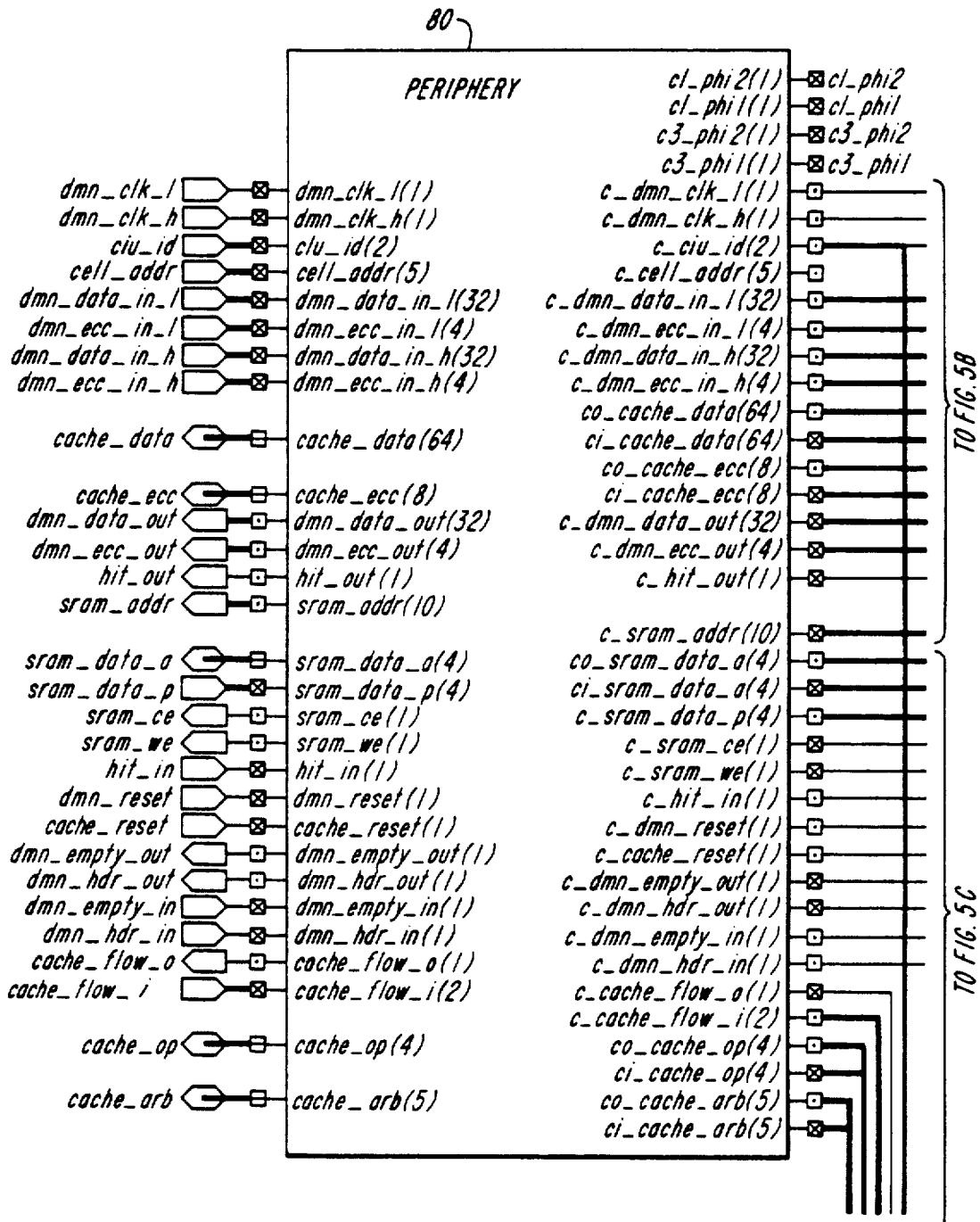
FIG. 5 comprising 5A, 5B and 5C depicts detail of the structure of a cell interconnect unit in the cell interconnect of FIG. 4.
Figure 5C:
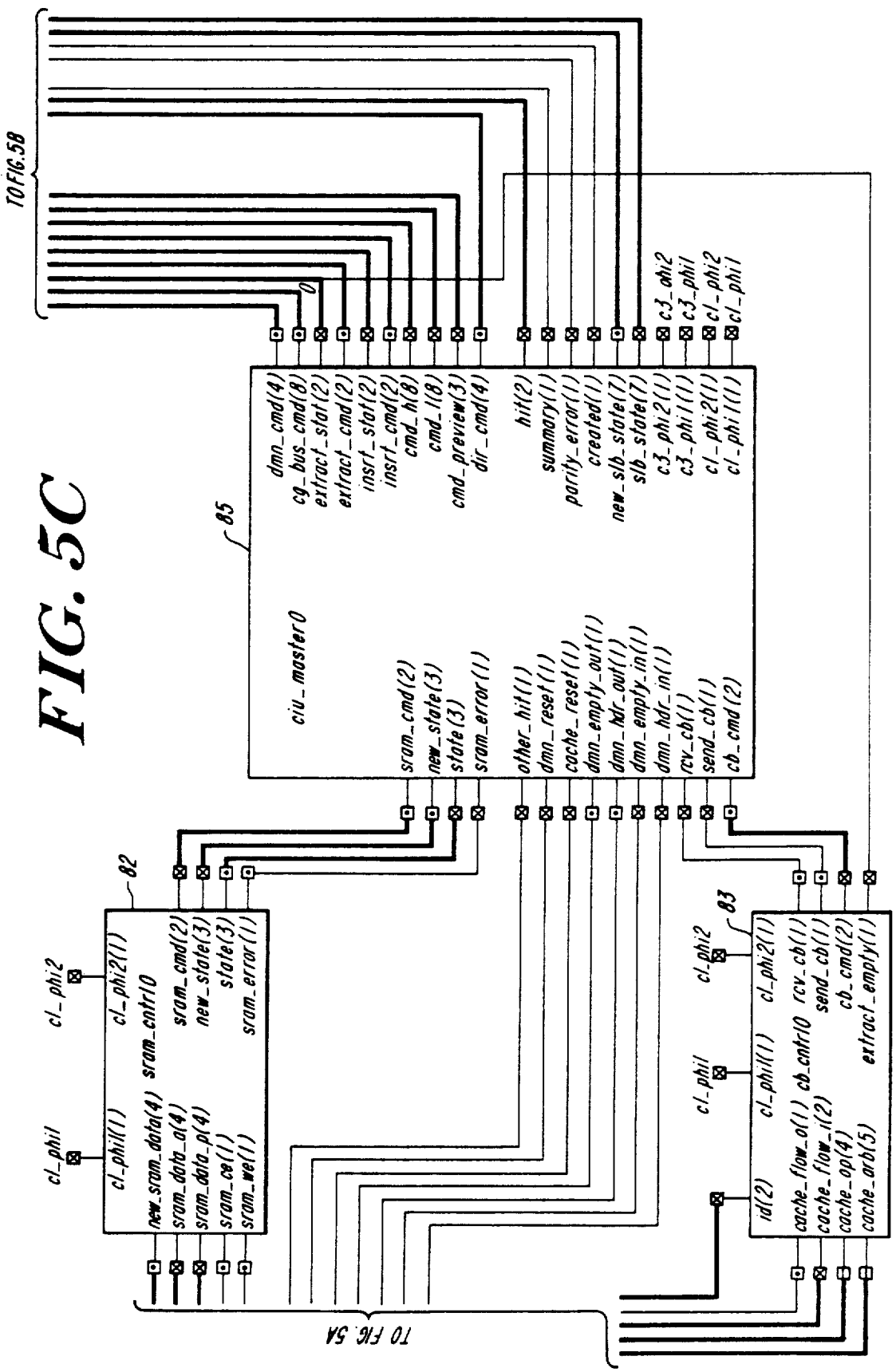

As FIG. 4 illustrates, each cell interconnect unit (CI) is formed by two cell interconnect units (CIUs), and associated SRAMs for storing state bits. Each cell interconnect unit (CIU), in turn, is constructed from a plurality of integrated circuits. The integrated circuits which form cell interconnect unit (CIU) 72 are depicted in FIG. 5.

The cache bus connection of the cell interconnect is a bi-directional interface. The cell interconnect receives data from the cache bus to send to the ring and places data it receives from the ring onto the cache bus to be serviced by the cache control unit or domain routing unit. The structure and operation of preferred cache control and domain routing units are described in U.S. Ser. No. 136,930.

As illustrated in FIG. 6, each cell interconnect contributes two shift register stages to the shift register structures of rings A and B. For example, a ring with ten cell interconnects, such as rings A and B shown in FIG. 6, consists of twenty pipeline stages. Each pipeline stage is capable of selectively storing and transferring an information-representative signal representing one data word. All data words circulate through the ring by progressing, in parallel, at the rate of one stage per applied clock cycle. It is this feature of the invention which allows each cell to uniquely identify the source and destination of each data word on the bus, and determine appropriate processing steps for each data word. One example of a preferred clock signal distribution configuration is depicted in FIG. 7.

In accordance with the invention, cell interconnect unit (CIU) 72 is constructed from periphery unit 80, CIU tag unit 81, SRAM control unit 82, cache bus control unit 83, CIU data path unit 84, CIU master control unit 85, and CIU directory unit 86. The integrated circuits illustrated in FIG. 5 contain latches, FIFO buffers, multiplexors (MUXs) and other conventional logic elements.

In particular, the CIU datapath associated with CIU datapath circuit 84 is a 36 bit wide datapath including low and high cache group units, an extract FIFO and an insert FIFO. These four units collectively provide paths for (i) moving addresses from the domain interconnected by rings A and B, and from the cache bus, to the directory for address lookup, (ii) moving packets through the two pipeline stages of each CIU, (iii) moving packets from the domain to the cache bus, and (iv) moving packets from the cache bus to the domain.

The low and high cache group units direct appropriate addresses to the CIU directory circuit 86 for lookup, and provide modification of directory entries. In particular, the cache group units can pass domain, cache or recirculated addresses for lookup operations, modify directory entries, and move data from directory 86 to the associated cache bus.

The extract FIFO unit moves data from the CIU domain inputs into a holding register file, and subsequently passes the data to the associated cache bus. The insert FIFO unit moves data from the cache bus inputs into a holding register file, and subsequently passes this data to the CIU domain outputs. Additionally, the insert FIFO unit provides for modifying packets on the domain formed by rings A and B. The datapath control section associated with CIU datapath unit 84 receives commands from the master control unit 85 and converts them into command signals for use by the elements of the CIU datapath. Detailed schematics and timing diagrams for the elements of these integrated circuits are set forth in Appendix A, incorporated herein.

Top level control of the CIU 72 is managed by the CIU master control circuit 85 the SRAM control circuit 82, and the cache bus control circuit 83. The master control circuit 85 receives PACKET HEADER and EMPTY STATUS bits, and provides sequencing to the directory block to perform address lookups. The master control circuit 85 utilizes the results of these lookup operations to determine which of the PASS, EXTRACT and INSERT operations, discussed in greater detail hereinafter, is appropriate. The master control circuit 85 performs these operations based upon signals from the CIU data path circuit 84 and cache bus control circuit 83.

The SRAM control circuit 82 generates control signals for addressing the external SRAMS 70 and 71 used by the CIU 72 and illustrated in FIG. 4. The cache bus control circuit 83 manages arbitration and flow control on the cache bus, as described in U.S. Ser. No. 136,930. The cache bus control circuit 83 receives command signals from the master control circuit 85, and in turn, transmits status report signals to the master control circuit 85.

SIGNALS AND FIELDS

As FIG. 7 illustrates, a single domain clock signal (h,l), generated by clock generator 30, is distributed to the entire domain interconnect formed by rings A and B. Domain clock (h,l) provides 50 mhz synchronous timing information to the cell interconnects within the domain interconnect formed by rings A and B.

By properly distributing domain clock (h,l), the effective clock skew for a cell interconnect such as, for example, the cell interconnect 14 corresponding to cell 4, is the clock skew between that cell interconnect's input stage 14.0 and prior adjacent cell interconnect (cell 2) and its output stage 14.1 and next adjacent cell (cell 6). An important advantage of the invention is that clock skew is not accumulative, and propagation time between cell interconnects is independent of the number of cell interconnects or stages.

The fundamental result is that the clock cycle time —i.e. the inverse of the clock frequency —of the domain interconnect is simply the cycle time between two adjacent cell interconnects. The clock cycle time does not increase and frequency does not decrease as the number of cell interconnects is increased. Thus, as the number of cell interconnects in a ring is increased, the flux of operations through the ring is constant, while the number of bus operations which can be executed during a complete bus cycle increases linearly. This is an important feature of the invention, which is ideally suited for multiprocessor structures.

The high speed nature of a domain interconnect constructed in accordance with the invention is further enhanced by two topological factors. First, the output (i.e. second) stage of each cell interconnect drives a single load, the input stage of the adjacent cell interconnect. Second, each cell interconnect requires connection to only its two neighboring cell interconnects, allowing close proximity of all directly connected cell interconnects. This combination of absolute minimal loading and very short physical distance between adjacent cells minimizes propagation time between cell interconnects.

Those skilled in the art will understand that while the embodiment described above in connection with FIG. 7 utilizes a synchronous clock, the invention can be practiced in connection with an asynchronous or self-timed clock configuration.

In accordance with the invention, data circulating through a given ring is divided into data packets of ten data words, corresponding to ten shift register ring stages. The number of shift register stages must be an exact multiple of the number of data words in a data packet. Given, for example, a ring with twenty cells and two register stages per cell, the ring consists of forty stages. Thus, four ten-word Packets can be transferred simultaneously in this ring. This property is generalized below in Table I.

TABLE I

| Number of CI | Number of Stages | Number of Packets |
|---|---|---|
| 5 | 10 | 1 |
| 10 | 20 | 2 |
| 15 | 30 | 3 |
| 20 | 40 | 4 |

The invention is preferably practiced in connection with the packet configuration shown in FIG. 8. The first data word in each half is an address, the second data word is a command and the remaining data words are data, as indicated in FIG. 8. Those skilled in the art will understand that alternative packet configurations are possible and within the scope of the invention.

In addition to the operations described above, a cell interconnect can modify the command field of a packet. For example, a cell interconnect can extract a packet by copying the packet from the ring and changing the command field to EMPTY. Alternatively, if a cell interconnect merely copies a packet, the command field would remain unchanged, allowing the packet to continue to circulate through the ring.

All packets circulate through the domain interconnect only once. This property results from an operational protocol in which each operation is created and retired by the same cell interconnect. Cells which extract a packet to add response data must later re-insert the packet.

The operations that the cell interconnect units can perform on packets thus include the following:

PASS PACKET: The cell interconnect unit passes a packet from its ring inputs to its ring outputs without any modification if the packet specifies an address of which the cell interconnect has no knowledge.

EXTRACT PACKET: The cell interconnect unit extracts a Packet from the ring if it represents a request the cell interconnect unit made to the ring or contains an address the cell interconnect unit must act upon. When a cell interconnect unit extracts a packet from the ring it modifies the command of the packet to indicate the extraction.

SEND PACKET to the Cache Bus: The cell interconnect unit sends each packet that it extracts from the ring to the cache bus for service by the cache controller.

RECEIVE PACKET from the Cache Bus: The cache controller can send a packet to the cell interconnect unit for insertion into the ring. The cell interconnect unit receives these packets and retains them until they can be inserted into the ring.

INSERT PACKET: The cell interconnect unit inserts a packet into the ring whenever it has a packet awaiting insertion and the current ring packet is marked as EMPTY.

In a preferred embodiment of the invention, the domain interconnect formed by rings A and B supports two sets of fields, referred to as the domain fields and the cell interconnect unit fields. The domain fields are established by serial connections from one cell interconnect to the next cell interconnect, which form a ring. Each cell interconnect has a separate receive and transmit port for the domain fields, as indicated in FIG. 4. The cell interconnect unit fields provide communication among the cell interconnect units of the cell. The domain fields are summarized below in Table II:

TABLE II

| DOMAIN FIELDS |
| --- |
| DOMAIN DATA |
| DOMAIN ECC |
| DOMAIN HEADER |
| DOMAIN CLOCK |
| CIU ID |
| CIU CELL ADDRESS |
| CIU EXTRACT |

The DOMAIN DATA and DOMAIN ECC fields are responsible for moving the data of ring operations. Each operation is a packet of ten domain bus transfers. The DOMAIN HEADER field marks the beginning of an operation. The DOMAIN CLOCK field provides timing for the shift register structure in cooperation with the clock generator illustrated in FIG. 7. The CIU ID field identifies the type of cell interconnect unit involved in a given transfer. The CIU CELL ADDRESS field identifies the domain local address of the cell. The CIU EXTRACT field communicates information between cell interconnect units.

In operation, the DOMAIN DATA field transmits the address, command, and data information corresponding to an operation. The configuration of the DOMAIN DATA field consists first of an address, then a command, and finally eight data values, one or more of which may be empty.

The DOMAIN ECC field transmits a Hamming based error correction code (ECC) word for each domain data transfer. DOMAIN ECC is not generated or checked by the cell interconnect units, but passed unchanged to the target units.

The DOMAIN HEADER field designates a given word in the current domain data transfer as the first word of a packet.

The assertion of the DOMAIN RESET signal by the domain structure or domain power controller causes each cell interconnect and corresponding cell to enter a reset state. The reset state is described in U.S. Ser. No. 136,930.

The assertion of CELL RESET by a cell causes the corresponding cell and cell interconnect to reset. When reset, cell interconnects perform only PASS PACKET operations.

The cell interconnect unit control fields provide for communication specific to the cell interconnect units. These cell interconnect unit control fields are summarized below in Table III.

TABLE III

| CIU Control Fields |
| --- |
| CIU ID |
| CIU EXTRACT |
| CIU CELL ADDRESS |

THE CIU ID field for each CIU is established by the configuration of electrical connections from the CIU to power and ground terminals. This configuration establishes a unique CIU identification number for each CIU. The interpretation of the identification number depends upon whether the plural ring structure is configured in a two-way or a four-way memory interleaving mode. Normally, ring A is configured for even page addresses in memory and ring B for odd page addresses in memory. However, those skilled in the art will appreciate that the shift register structure can be configured to pass all addresses on either ring. Page address interleaving is normally configured at system configuration time by control locations in the cell interconnects. Table IV below summarizes interpretation of id numbers in the two-way interleaved mode.

TABLE IV

| TWO WAY INTERLEAVED | |
| --- | --- |
| ID VALUE | DEFINITION |
| 0 | Master CIU 1 |
| 1 | Master CIU 1 |
| 2 | Slave CIU 0 |
| 3 | Slave CIU 1 |

Table V below summarizes interpretation of id numbers in the four-way interleaved mode:

TABLE V

| FOUR WAY INTERLEAVED | |
| --- | --- |
| ID VALUE | DEFINITION |
| 0 | MASTER 0 |
| 1 | Master CIU 1 |
| 2 | Master CIU 2 |
| 3 | Master CIU 3 |

When two CIUs are partnered as master and slave, the slave cell interconnect unit drives a one-bit CIU EXTRACT signal which is read by its partner master cell interconnect unit. The CIU EXTRACT signal is asserted or de-asserted according to whether the slave CIU identifies the current operation as requiring removal from the shift register structure.

The CIU CELL ADDRESS signal represents the address within the domain of the cell asserting the signal.

In accordance with the invention, all domain interconnect transfers form a single packet. The domain interconnect formed by the plural rings is initialized to contain a fixed number of packets based on the number of cell interconnects. For example, a twenty cell domain interconnect contains eight packets per ring. Thus, in this example, eight packets per ring, or sixteen packets per domain interconnect, can be transferred in parallel.

In a preferred practice of the invention in conjunction with a multiprocessor structure like that described in U.S. Ser. No. 136,930, the cell interconnect performs two levels of interpretation in order to determine how to operate on a packet. First, the cell interconnect examines the address specified in the packet. The cell interconnect may be configured to operate as a Positive or a negative filter. As a positive filter, it operates on any System Virtual Address (SVA) that has an entry in its cache descriptors. The interaction of SVA addresses and cache descriptors is further described in U.S. Ser. No. 136,930. The positive filter configuration is used when a cell interconnect is connected to a cache either directly or by a remote interface. The negative filter configuration is used when the cell interconnect is connected to a router. In either configuration, the cell interconnect operates on SVA addresses directed to it.

Secondly, having recognized an address, the cell interconnect examines the command portion of the packet to determine if it can modify the response field of the command and allow the packet to proceed, or whether it must extract the packet from the domain interconnect.

A cell interconnect can insert a packet into the ring when an empty packet arrives. An empty packet is indicated by an IDLE operation type in the command word of the packet. Evenly distributed usage of the packets of the ring is provided by the invention because no cell interconnect can use a packet that it has just emptied by an extraction operation. In order to perform an insertion, the cell interconnect must place its operation into the ten consecutive stages of the empty packet.

It will be understood that given the plural ring structure of the invention, the cell interconnect which initially injects a particular operation into the ring will eventually receive that operation back. At that time, the cell interconnect destroys the operation by changing the command word to IDLE. Any cell interconnect that removes an operation it did not create must return that operation to the ring.

A cell interconnect extracts an operation from the ring by copying its contents from the ten consecutive stages of its packet and writing the IDLE operation type into the command word of the packet. Any cell interconnect that extracts an operation it did not create must return that operation to the ring.

The bus structures are initialized in two steps. First, the domain stages are formatted into ten word packets by initializing the domain header signal. Secondly, each packet is initialized to an IDLE state. If the number of stages in either ring is not an even multiple of ten stages, or if the circular path is logically broken, the ring will not initialize.

In a preferred embodiment of the invention, bus initialization is performed by software, with cell interconnect assist. Within each cell interconnect is a DOMAIN HEADER STATUS bit which indicates whether the domain is properly formatted by verification of the DOMAIN HEADER signal. If the DOMAIN HEADER STATUS bit indicates that a given ring is improperly formatted, then a SETUP DOMAIN command issued by a given cell to a cell interconnect performs domain initialization.

It will thus be seen that the invention efficiently attains the objects set forth above, among those made apparent from the preceding description. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also understood that the following claims are intended to cover all of the generic and specific features of the invention as described herein, and all statements of the scope of the invention which, as a matter of language, might be said to fall therebetween.

U.S. Patent Application for

INTERCONNECTION SYSTEM FOR MULTIPROCESSOR STRUCTURE

STEVEN J. FRANK

HENRY J. BURKHARDT III

FREDERICK D. WEBER

APPENDIX A

Cell Interconnect Schematics and Clock Diagrams

SCHEMATICS and DIAGRAMS
1. CI
2. CIU
3. directory
4. cache group
5. data path
6. data path cell
7. data path cache group low
8. data path cache group high
9. data path extract fifo
10. data path insert fifo
11. clocks
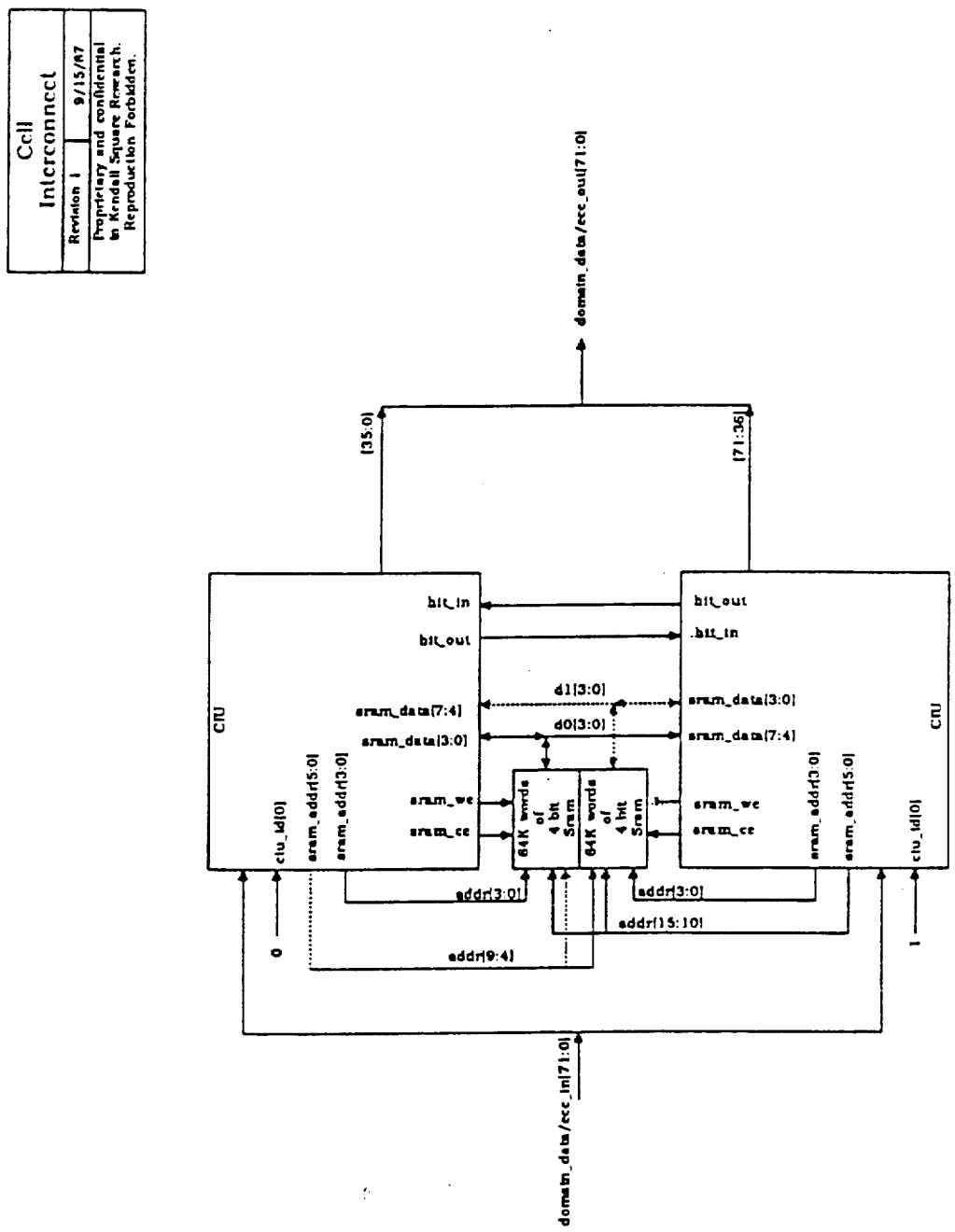

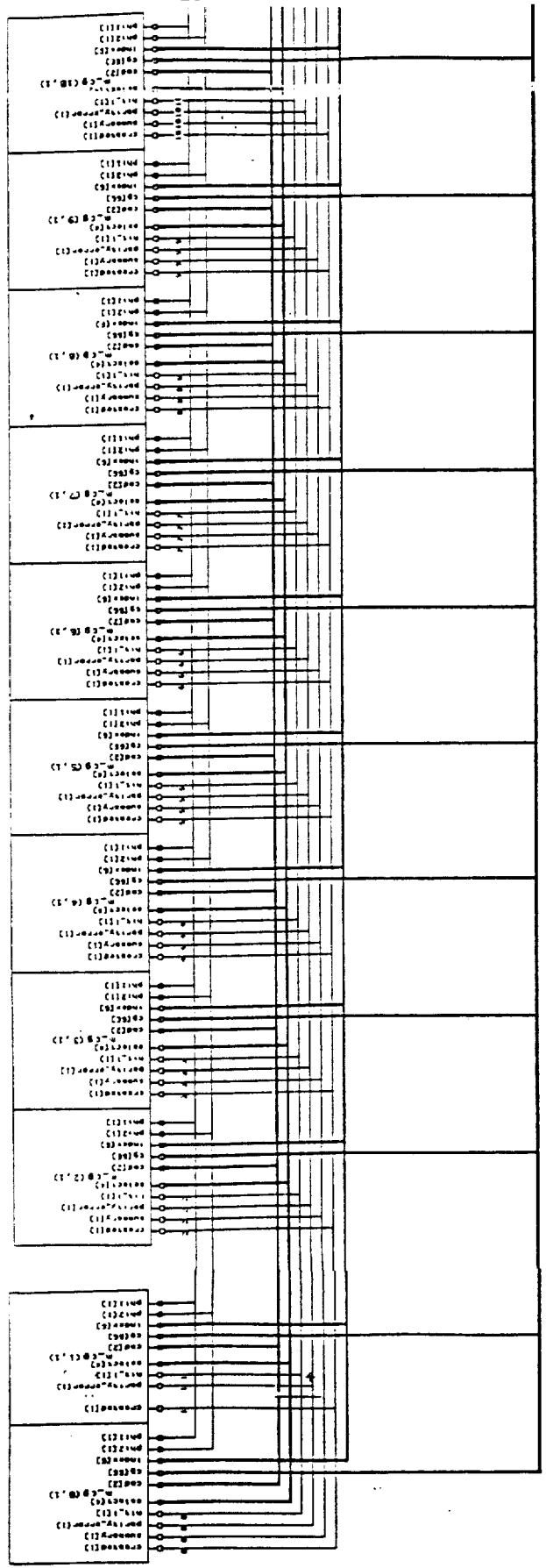
CIU Directory Schematic (1,0)

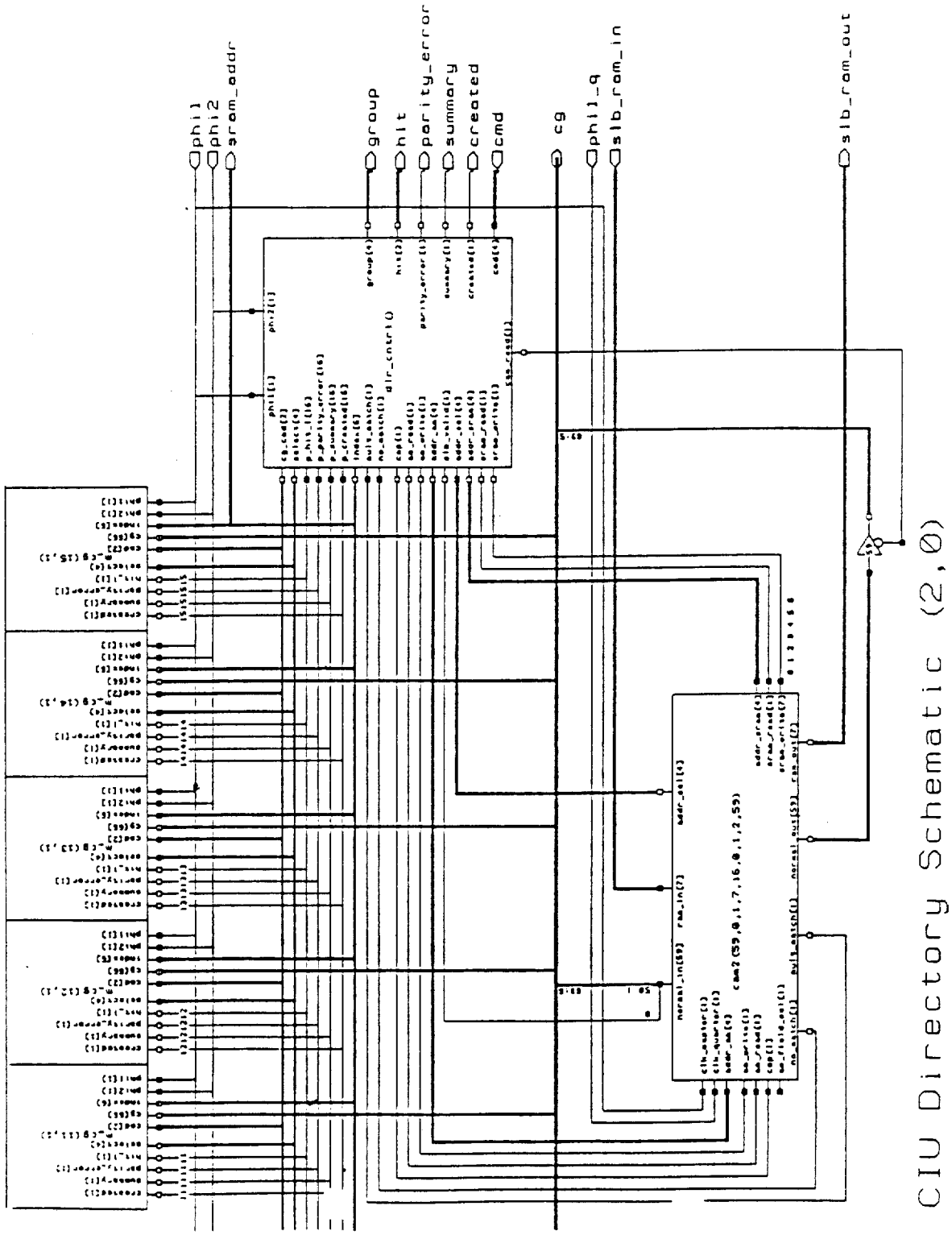

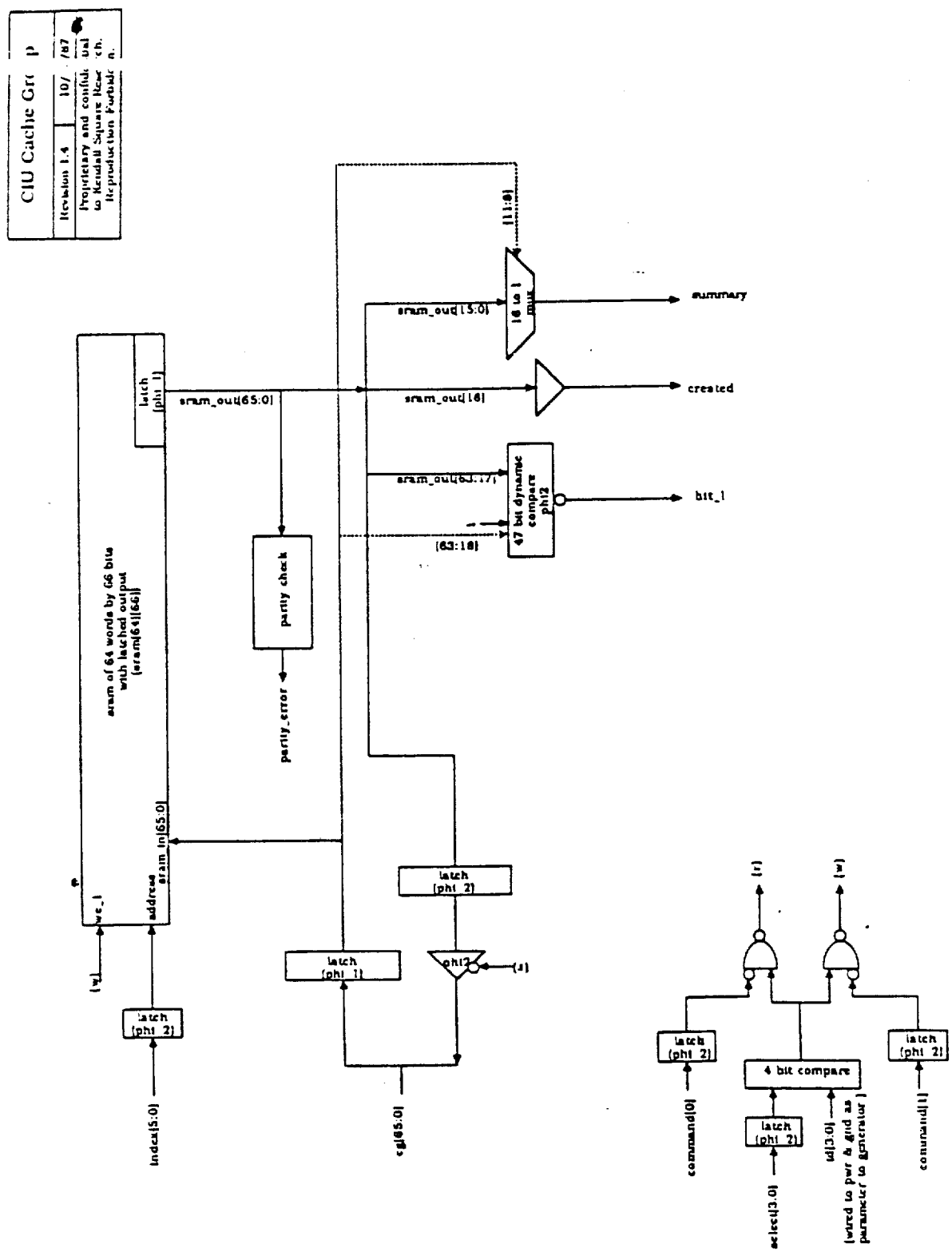

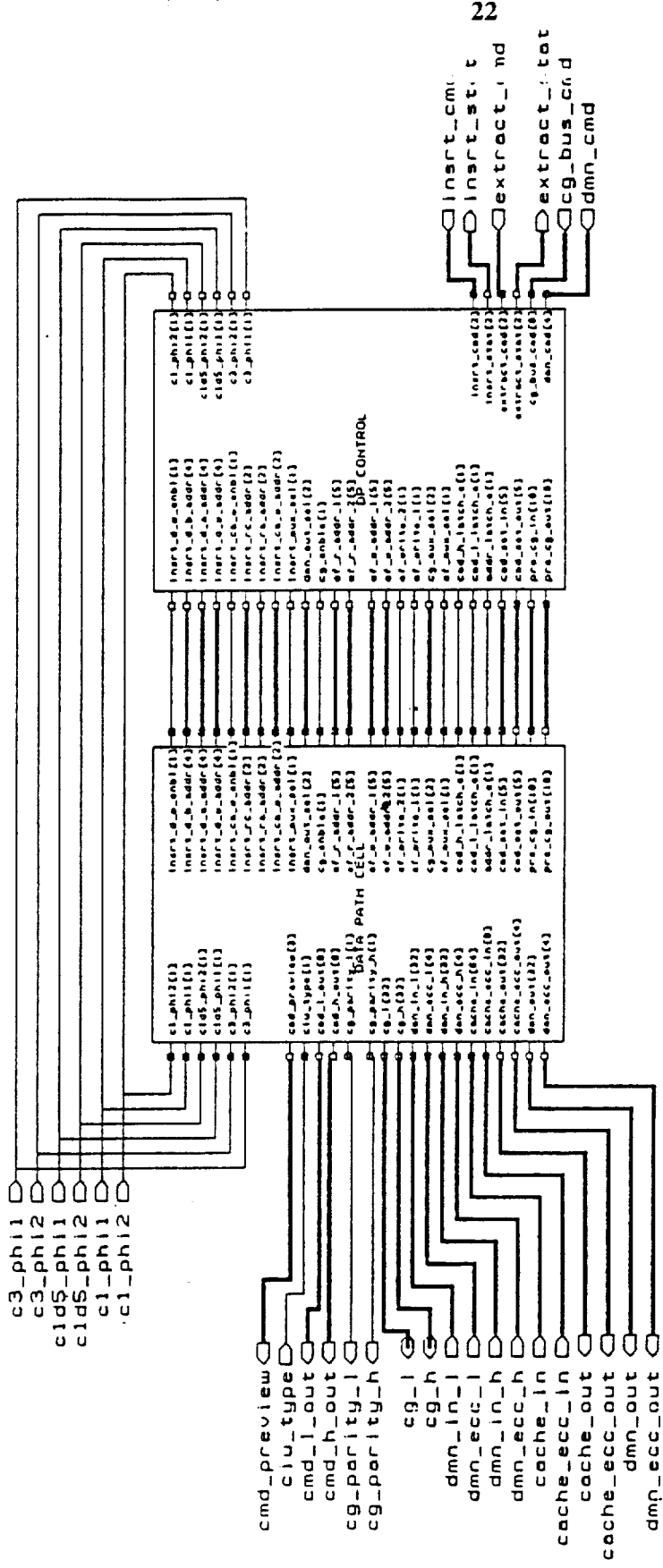

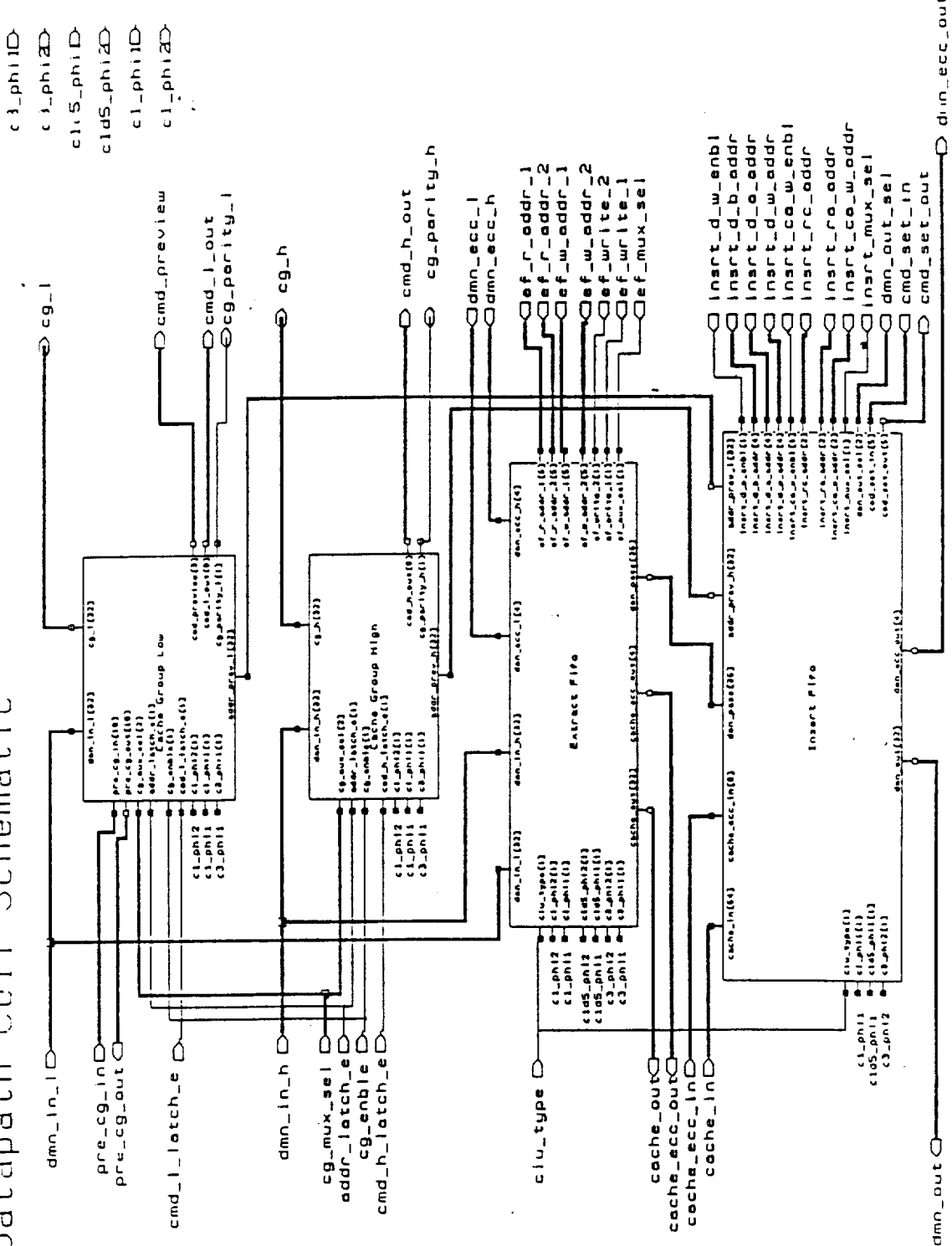

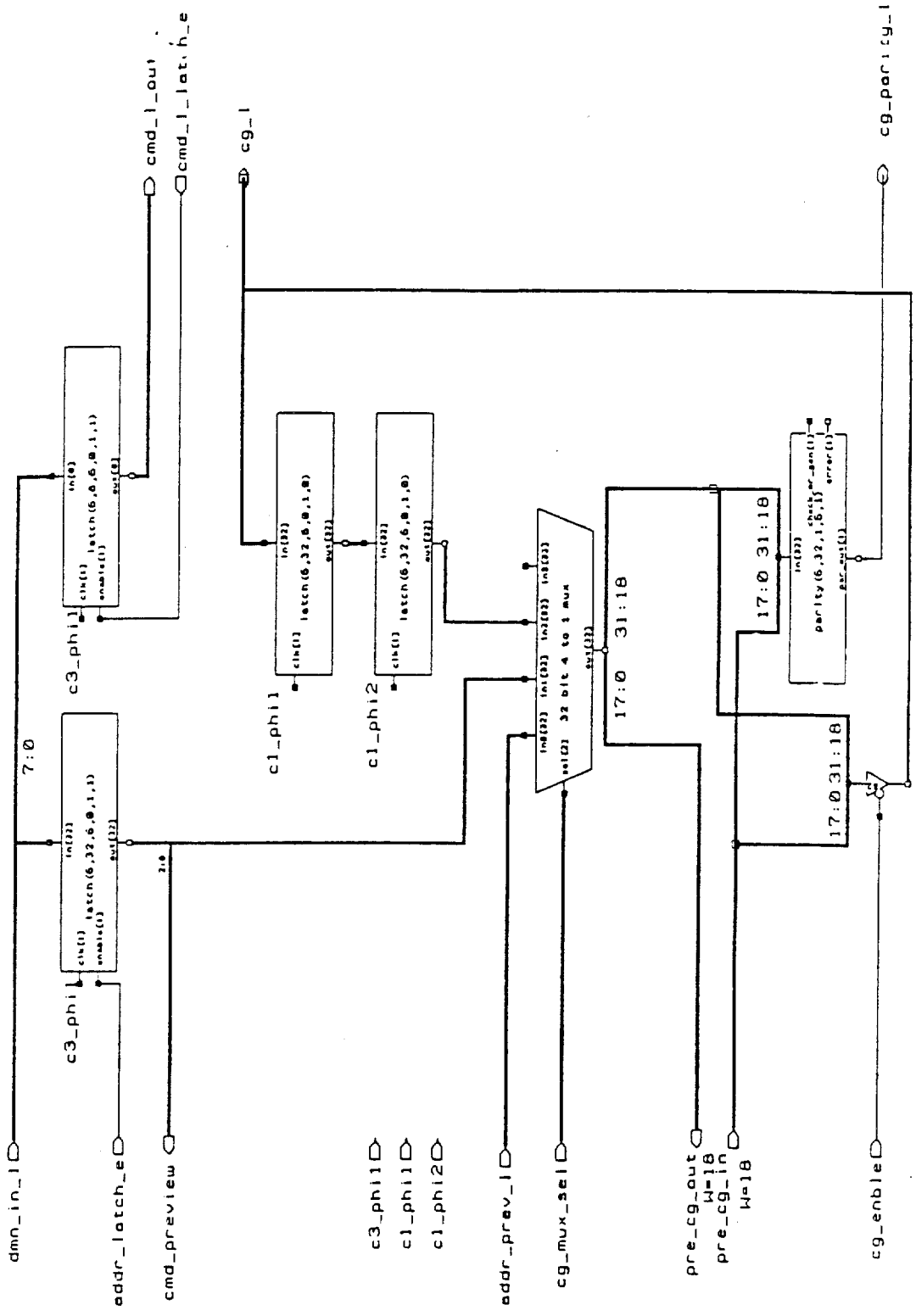

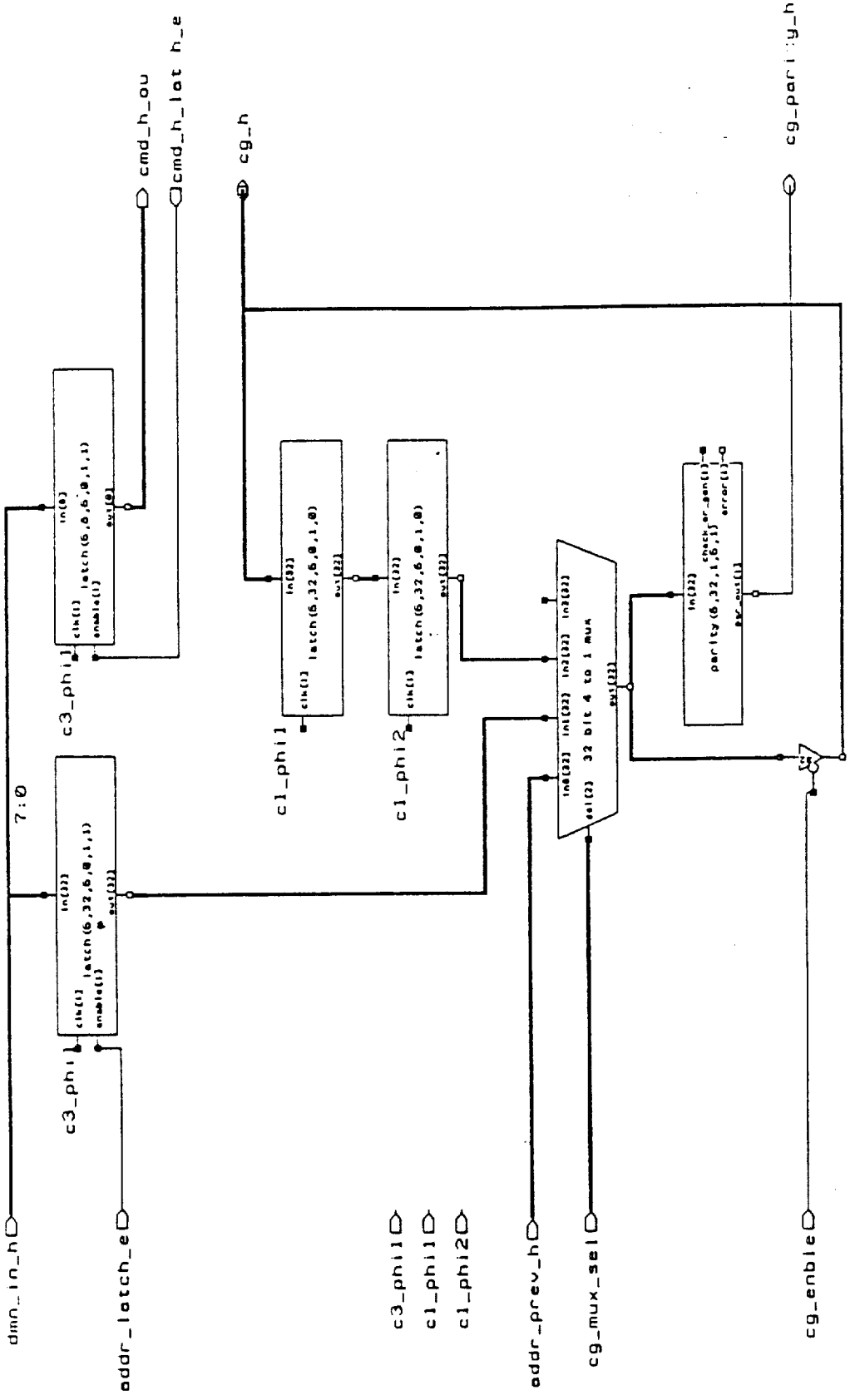

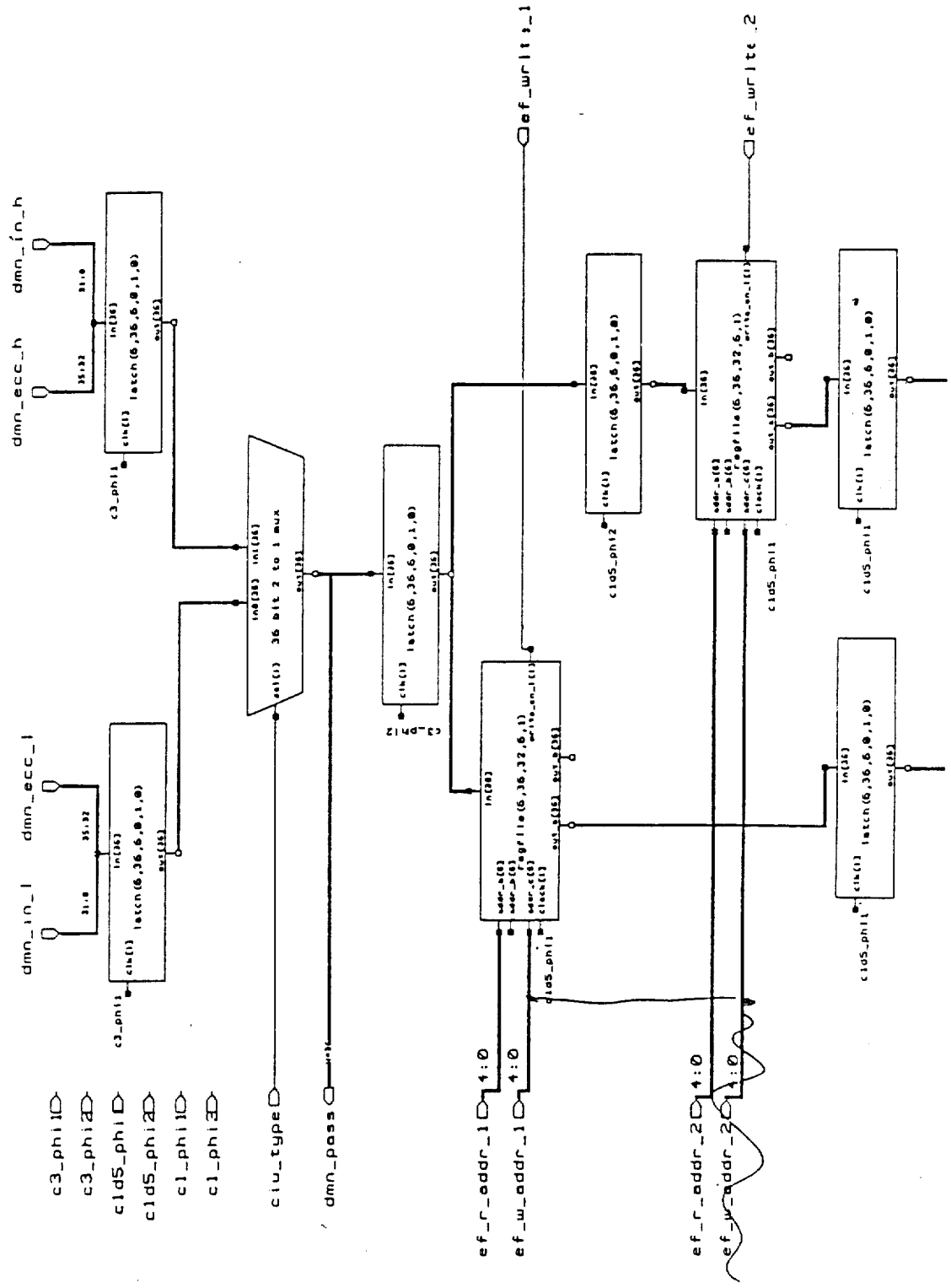

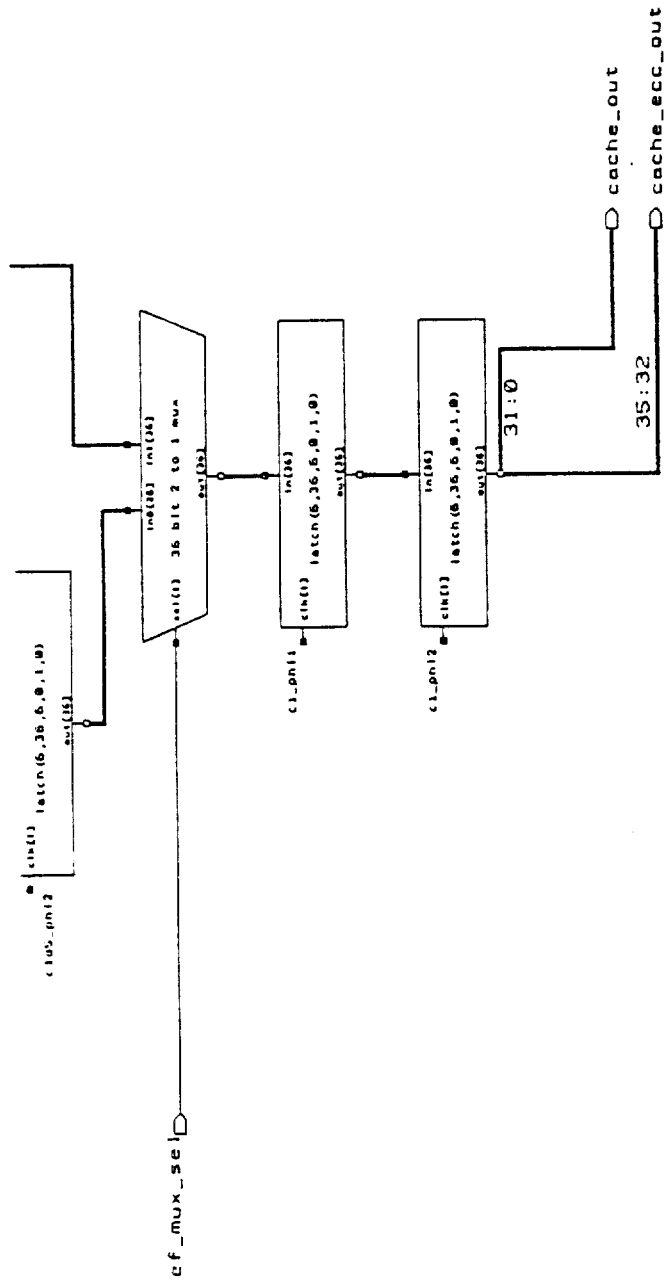
CIU Datapath Extract Fifo Schematic (0,1)

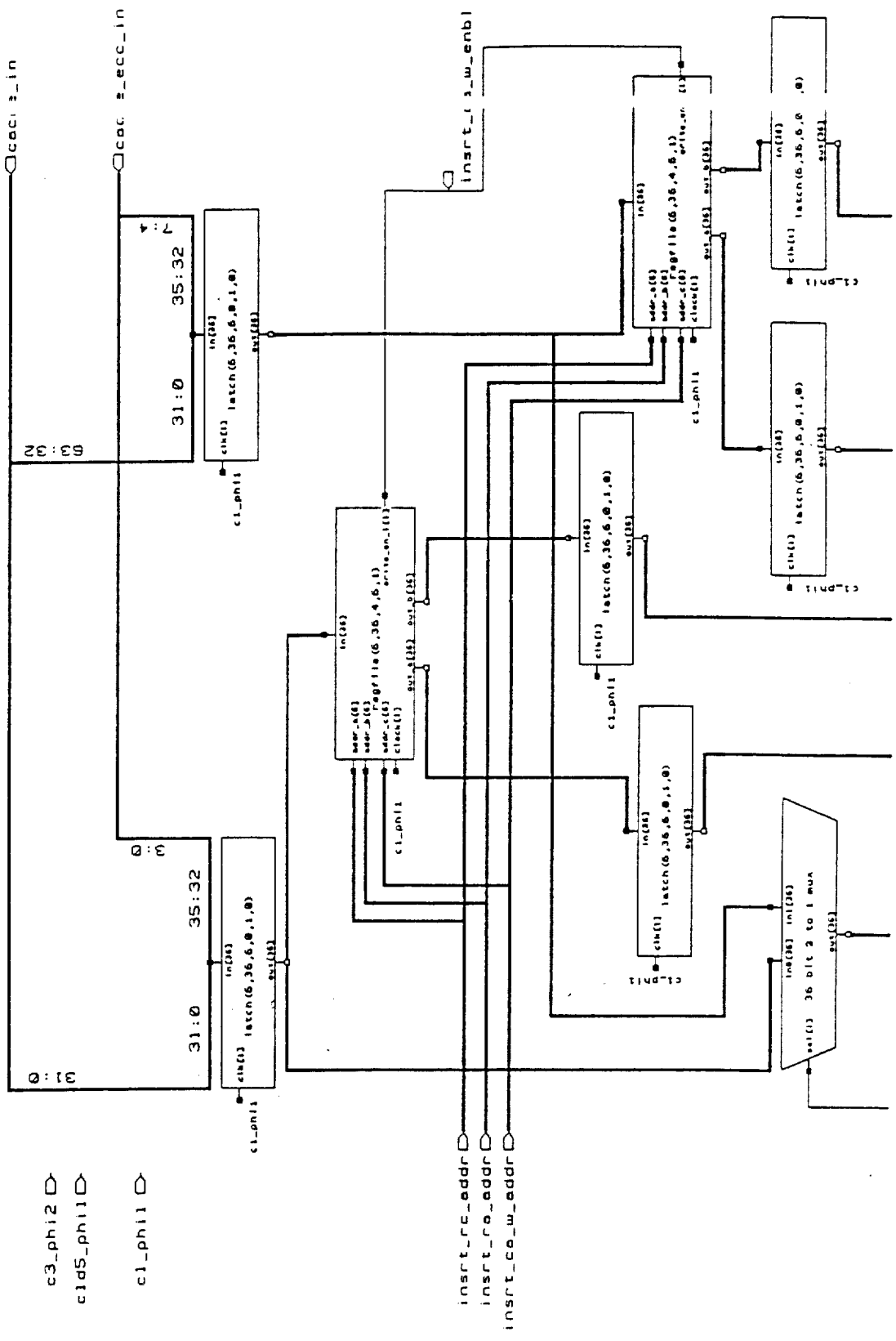

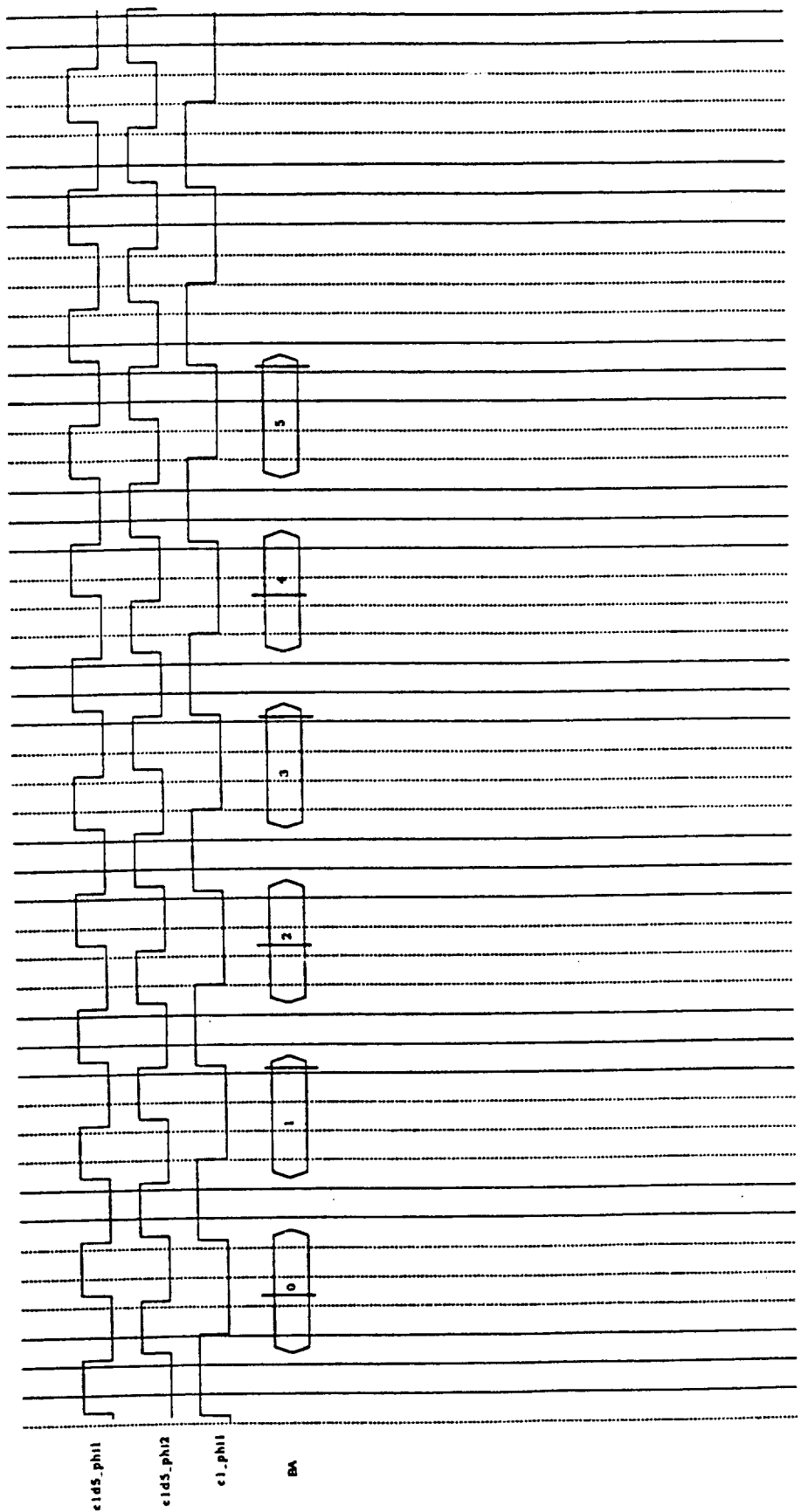

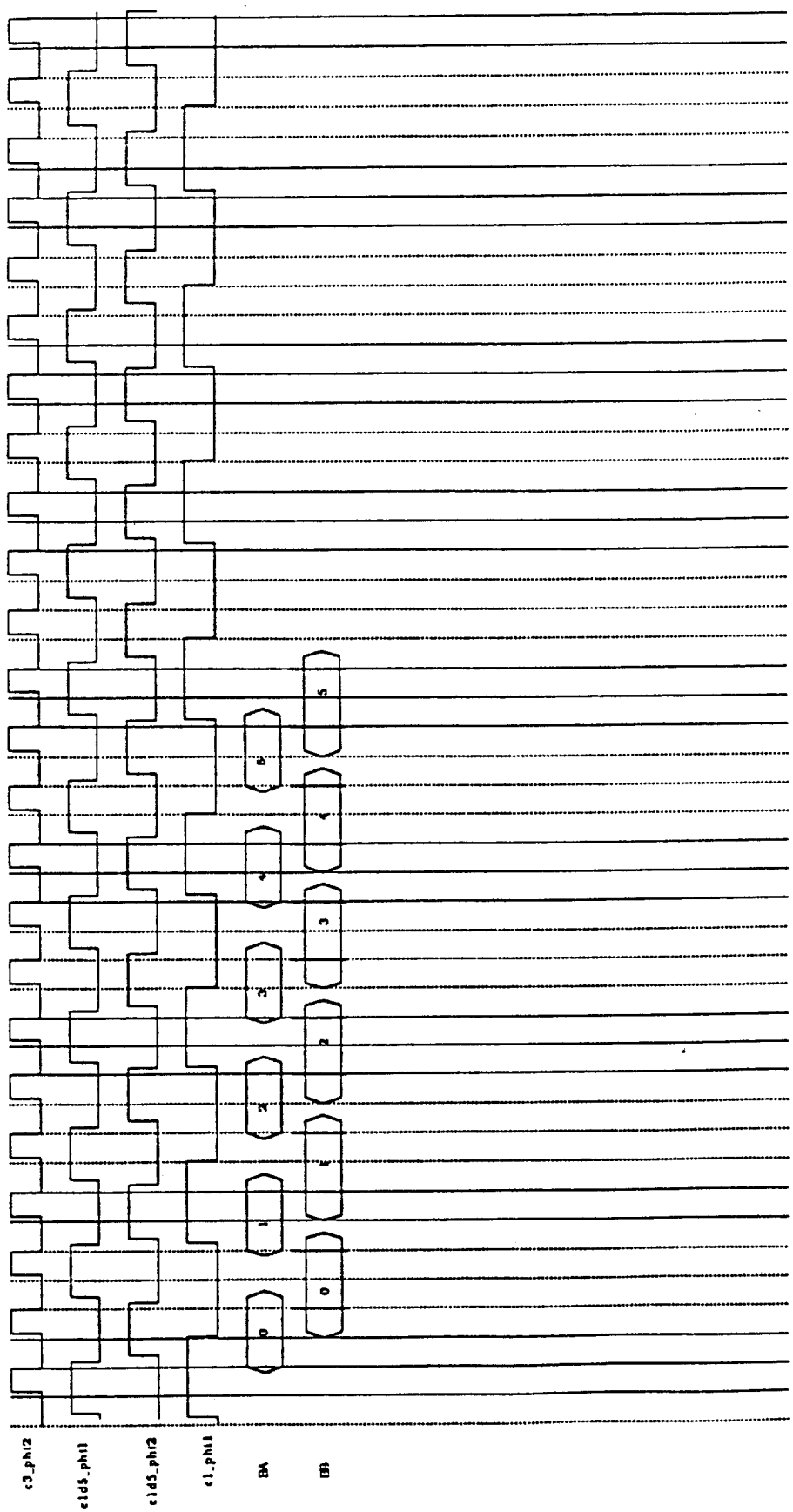

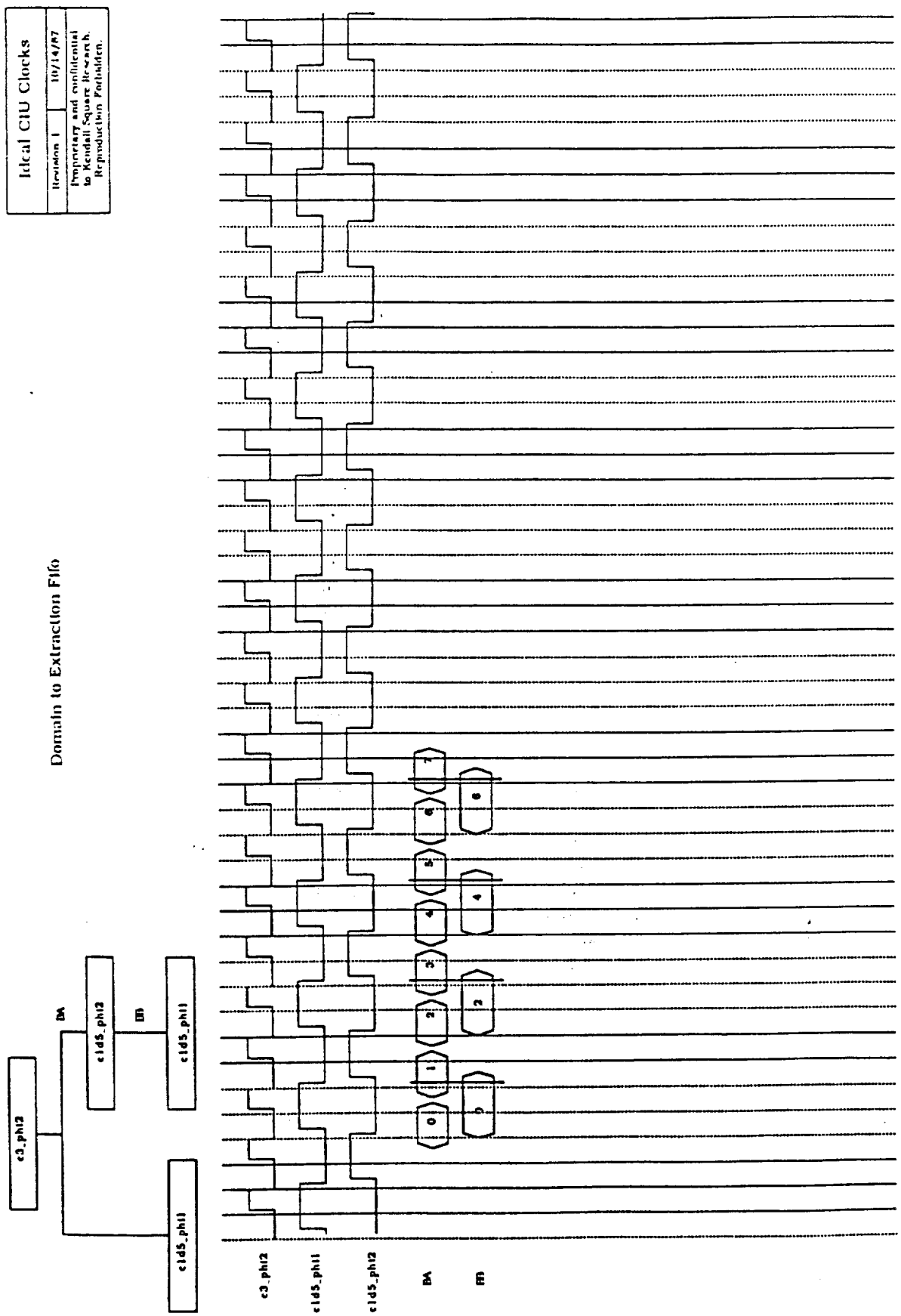

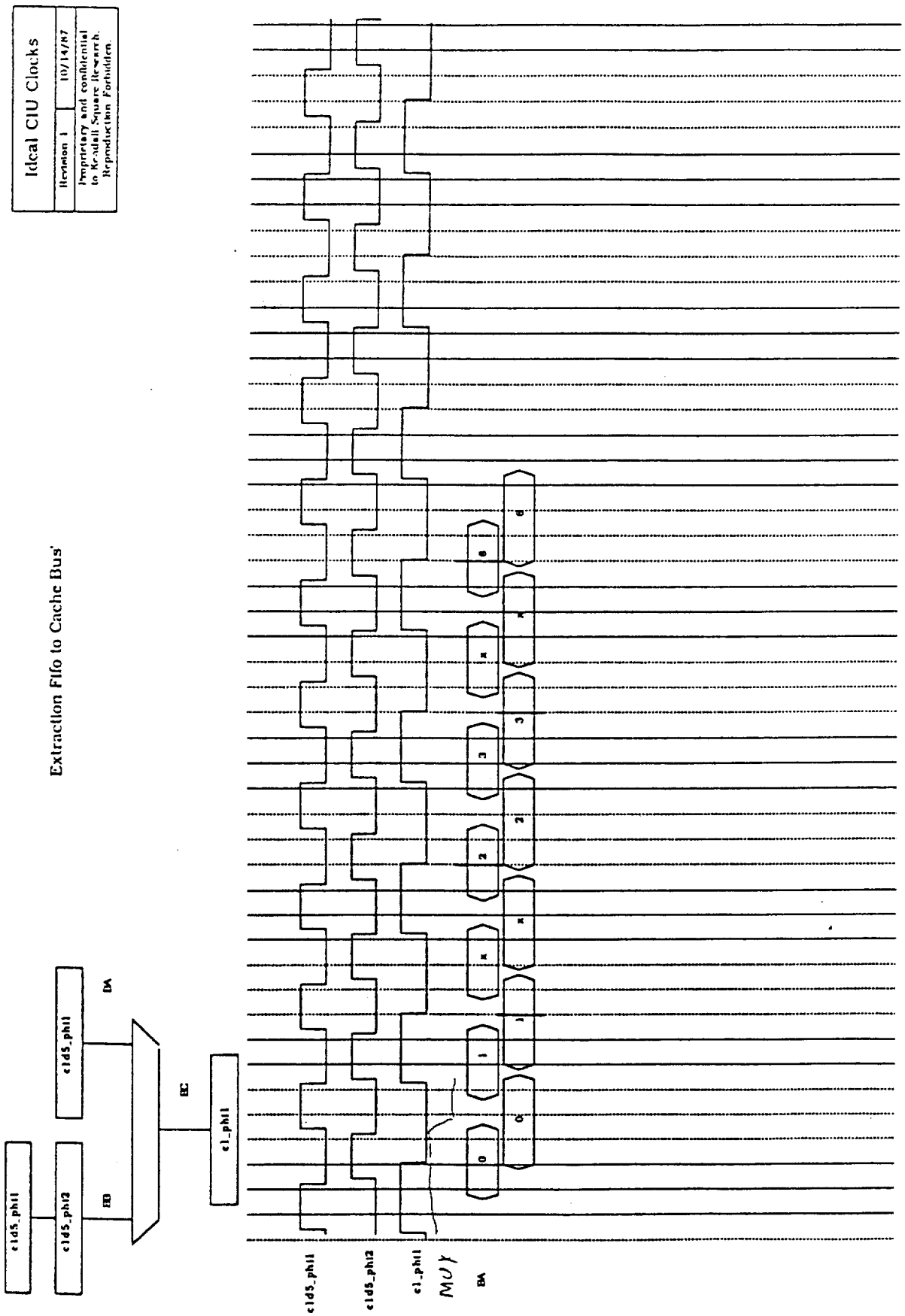

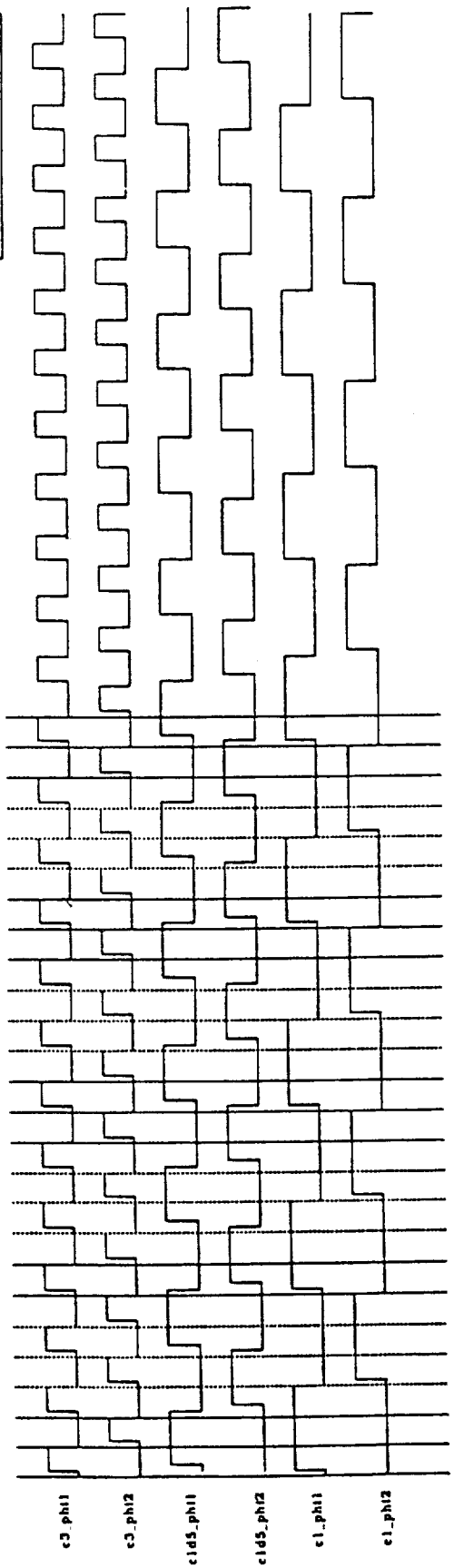

Having described the invention, what is claimed as new and secured by Letters Patent is:

1. A digital data processing apparatus comprising
   A. bus means for transferring packets of information-representative digital signals, said bus means including shift register means comprising a plurality of digital storage and transfer stages connected in series in a ring configuration for sequentially storing and transferring said information-representative digital signals, wherein each said stage within said shift register means includes means for storing an information-representative signal of (M) bits, where (M) is greater than one,
   B. a plurality of processing cells, connected in a ring configuration through said bus means, each processing cell being in communication with an associated subset of (N) said stages, where (N) is greater than one, at least one of said cells having associated memory means coupled thereto for storing a plurality of information-representative digital signals.
   C. said at least one said processing cell further including cell interconnect means, connected to said associated subset of stages and said associated memory means, for selectively transferring information-representative signals between said associated subset of stages and said associated memory means,
   D. said cell interconnect means including means for performing at least one of modifying, extracting, replicating and transferring a packet of digital information-representative signals, wherein at least a portion of said packet is stored within said associated subset of stages, based on an association, if any, between an information-representative signal identified in that packet and one or more information-representative signals of said plurality of information-representative signals stored in said associated memory means, and
   E. said cell interconnect means including means responsive to applied digital clock cycle signals for simultaneously transferring at least a selected digital signal packet through successive stages of said associated subset o stages, at a rate responsive to said digital clock cycle rate, while performing said at least one modifying, extracting, replicating and transferring operation on that same digital signal packet.

2. A digital data processing apparatus according to claim 1, wherein said at least one processing cell includes
   A. directory means for storing signals representative of one or more information-representative digital signals of said plurality of information-representative signals stored in said associated memory means,
   B. means coupled with said cell interconnect means and with said directory means for generating a cell interconnect control signal based on a comparison of said information-representative signal identified in said packet with those represented in said directory means, and
   C. said cell interconnect means includes means selectively responsive to said cell interconnect control signal for performing said at least one modifying, extracting, replicating and transferring operation on said digital signal packet.

3. A digital data processing apparatus comprising
   A. bus means for transferring packets of information-representative digital signals, said bus means including shift register means comprising a plurality of digital storage and transfer stages connected in series in a ring configuration for sequentially storing and transferring said information-representative digital signals, wherein each said stage within said shift register means includes means for storing an information-representative signal of (M) bits, where (M) is greater than one.
   B. a plurality of processing cells, connected in a ring configuration through said bus means, each processing cell being in communication with an associated subset of (N) said stages, where (N) is greater than one, at least one of said cells having associated memory means coupled thereto for storing information-representative digital signals,
   C. said at least one said processing cell further including cell interconnect means, connected to said associated subset of stages and said associated memory means, for selectively transferring information-representative signals between said associated subset of stages and said associated memory means, and
   D. said cell interconnect means including means responsive to applied digital clock cycle signals for simultaneously transferring at least a selected digital signal packet through successive stages of said associated subset of stages, at a rate responsive to said digital clock cycle rate, while performing at least one modifying, extracting, replicating and transferring operation on that same digital signal packet.

4. A data processing apparatus according to any of claims 1 - 3, wherein said at least one processing cell includes
   A. means for generating and transmitting to the associated cell interconnect means a cell interconnect control signal representative of a packet store request, and
   B. said associated cell interconnect means includes means responsive to said packet store request signal for storing a selected information-representative signal to an associated stage of said shift register means.

5. A data processing apparatus according to any of claims 1 - 3, wherein said at least one processing cell includes
   A. means for generating and transmitting to the associated cell interconnect means a cell interconnect control signal representative of a packet access request, and
   B. said associated cell interconnect means includes means responsive to said packet access request signal for providing said processing cell access to an information-representative signal stored in an associated stage of said shift register means.

6. A data processing apparatus according to any of claims 1 - 4, wherein said at least one processing cell includes
   A. means for generating and transmitting to the associated cell interconnect means a cell interconnect control signal representative of a packet extraction request, and
   B. said associated cell interconnect means includes means responsive to said packet extraction request signal for extracting an information-representative signal stored in an associated stage of said shift register means and for transferring that extracted information-representative signal to said associated processing cell.

7. A data processing apparatus according to any of claims 1 - 3, wherein said at least one processing cell includes
   A. means for generating and transmitting to the associated cell interconnect means a cell interconnect control signal representative of a packet replication request, and
   B. said associated cell interconnect means includes means responsive to said packet replication request signal for replicating an information-representative signal stored in an associated stage of said shift register means and for transferring that replicated information-representative signal to said associated processing cell.

8. A data processing apparatus according to any of claims 1 - 3, wherein said at least one processing cell includes
   A. means for generating and transmitting to the associated cell interconnect means a cell interconnect control signal representative of a packet transfer request, and
   B. said associated cell interconnect means includes means responsive to said packet transfer request signal for transferring unchanged and information-representative signal stored in a first associated stage of said shift register means to a second, succeeding associated stage of said shift register means.

9. A data processing apparatus according to any of claims 1 - 3, wherein said at least one processing cell includes
   A. means for generating and transmitting to the associated cell interconnect means a cell interconnect control signal representative of a packet identify request, and
   B. said associated cell interconnect means includes means responsive to said packet identify request signal to identify a given digital information-representative signal stored in an associated stage of said shift register means as the first information-representative signal of a digital signal packet.

10. A digital data processing apparatus according to claim 9, wherein said cell interconnect means includes
    A. means for generating and transmitting to the associated cell interconnect means a cell interconnect control signal representative of a packet identify command, and
    B. said cell interconnect means includes means responsive to said packet identify command signal for setting a digital information-representative signal stored in an associated stage of said shift register to a selected value identifying that information-representative signal as the first such signal in a digital signal packet.

11. A digital data processing apparatus according to any of claims 1 - 3, wherein said cell interconnect includes means for assembling a digital signal packet including at least one digital information-representative signal representative of a memory address, at least one digital information-representative signal representative of a command, and at least one digital information-representative signal representative of data.

12. A digital data processing apparatus according to claims 1–3, wherein said shift register means includes
    A. means for storing a given digital word in a firs stage of said shift register means, and
    B. means responsive to said applied digital clock signal for transferring said digital word stored in said first stage to a succeeding stage of said shift register means.

13. A digital data processing apparatus according to claim 12 wherein
    a given digital word is resident in said subset of stages associated with said cell interconnect means for (N) applied digital clock cycles.

14. A digital data processing apparatus according to claim 13, wherein said shift register means includes means for simultaneously transferring to successive said stages (p) digital signal packets, where (p) is a positive integer given by $$(p) = (c)(N)/(w)$$

where (c) is the number of said cell interconnect means connected to said bus means and (w) is the number of digital words in each digital signal packet.

15. A digital data processing apparatus according to claim 13, wherein as the number of stages of said shift register means increases, the flux of said digital words through said stages of said shift register means remains constant.

16. A digital data processing apparatus according to claim 13, wherein clock cycle skew associated with said at least one set of digital clock cycles remains substantially constant with reference to each of said (N) stages of said shift register means as the number (N) increases.

17. A digital data processing apparatus according to any of claims 1 - 3, wherein said cell interconnect means includes at least one of
    A. insert buffer means for storing at least a selected digital signal packet for transfer to at least one stage of said associated subset of stages for insertion into said shift register means, and
    B. second buffer means for storing at least a selected digital signal packet extracted from said associated subset of stages.

* * * * *

UNITED STATES PATENT AND TRADEMARK OFFICE
CERTIFICATE OF CORRECTION

PATENT NO. : 5,119,481

DATED : June 2, 1992

INVENTOR(S) : Steven J. Frank, Henry Burkhardt, III, and Frederick D. Weber

It is certified that error appears in the above-identified patent and that said Letters Patent is hereby corrected as shown below:

Title Page, item [54], lines 1-2, and Col. 1, lines 2-3, replace title "REGISTER BUS MULTIPROCESSOR SYSTEM WITH SHIFT" with -- MULTIPROCESSOR SYSTEM WITH SHIFT REGISTER BUS --.

Column 3, line 14, replace "Packets" with -- packets --.

Column 5, line 12, replace Passed with -- passed --.

Column 6, line 1, replace "(cache data)" with -- (cache_data) --.

Column 8, line 30, replace "ten-word Packets" with -- ten-word packets --.

Column 11, line 13, replace "as a Positive" with -- as a positive --.

Column 45, line 19, replace "signals." with -- signals, --

UNITED STATES PATENT AND TRADEMARK OFFICE
CERTIFICATE OF CORRECTION

PATENT NO. : 5,119,481

DATED : June 2, 1992

INVENTOR(S) : Steven J. Frank, Henry Burkhardt, III, and Frederick D. Weber

It is certified that error appears in the above-identified patent and that said Letters Patent is hereby corrected as shown below:

Column 45, line 41, replace "subset o stages" with -- subset of stages --.

Column 48, line 13, replace "word in a firs" with -- word in a first --.

Signed and Sealed this

Thirty-first Day of August, 1993

BRUCE LEHMAN

*Attest:*

*Attesting Officer*   *Commissioner of Patents and Trademarks*